Oct. 11, 1932.  W. B. WHITSITT  1,882,537
AIR CONDITIONING APPARATUS FOR PASSENGER CARS
Filed May 4, 1931  18 Sheets-Sheet 1
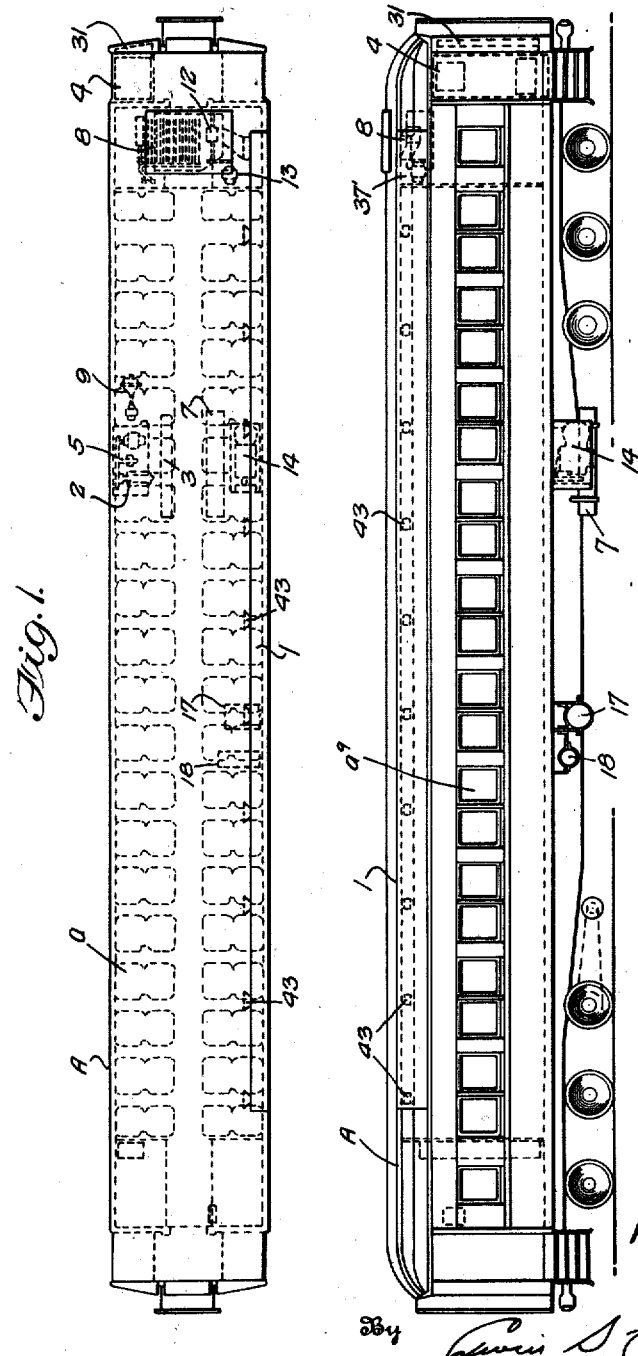
Inventor
WILLIAM B. WHITSITT.
By
Attorney Oct. 11, 1932.  W. B. WHITSITT  1,882,537
AIR CONDITIONING APPARATUS FOR PASSENGER CARS
Filed May 4, 1931  18 Sheets-Sheet 2
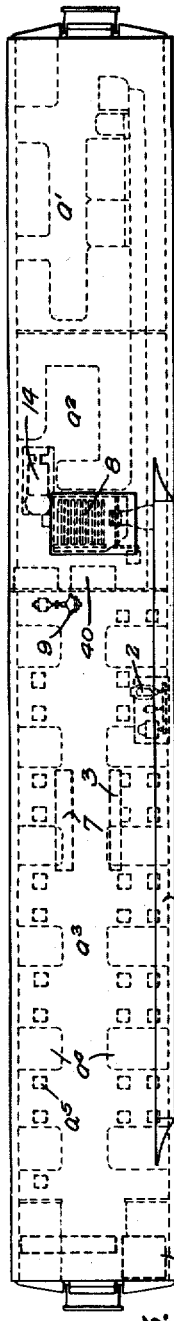
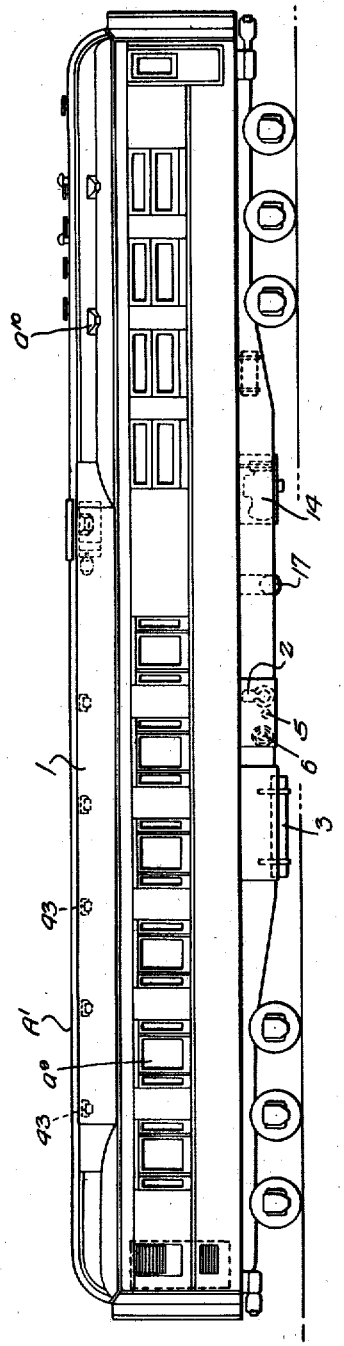
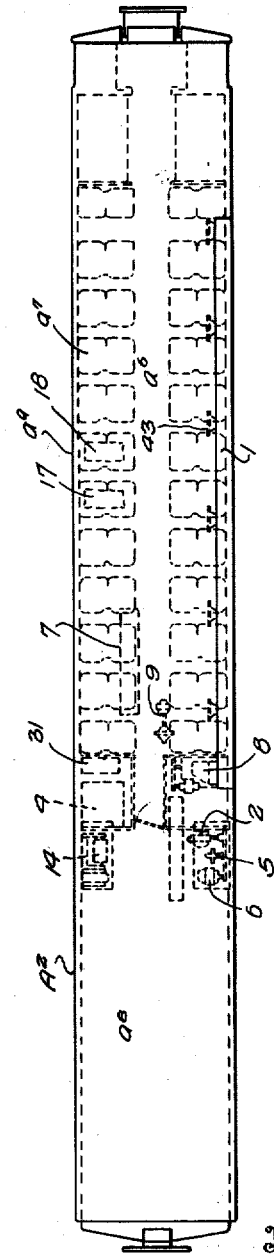
Inventor
WILLIAM B. WHITSITT

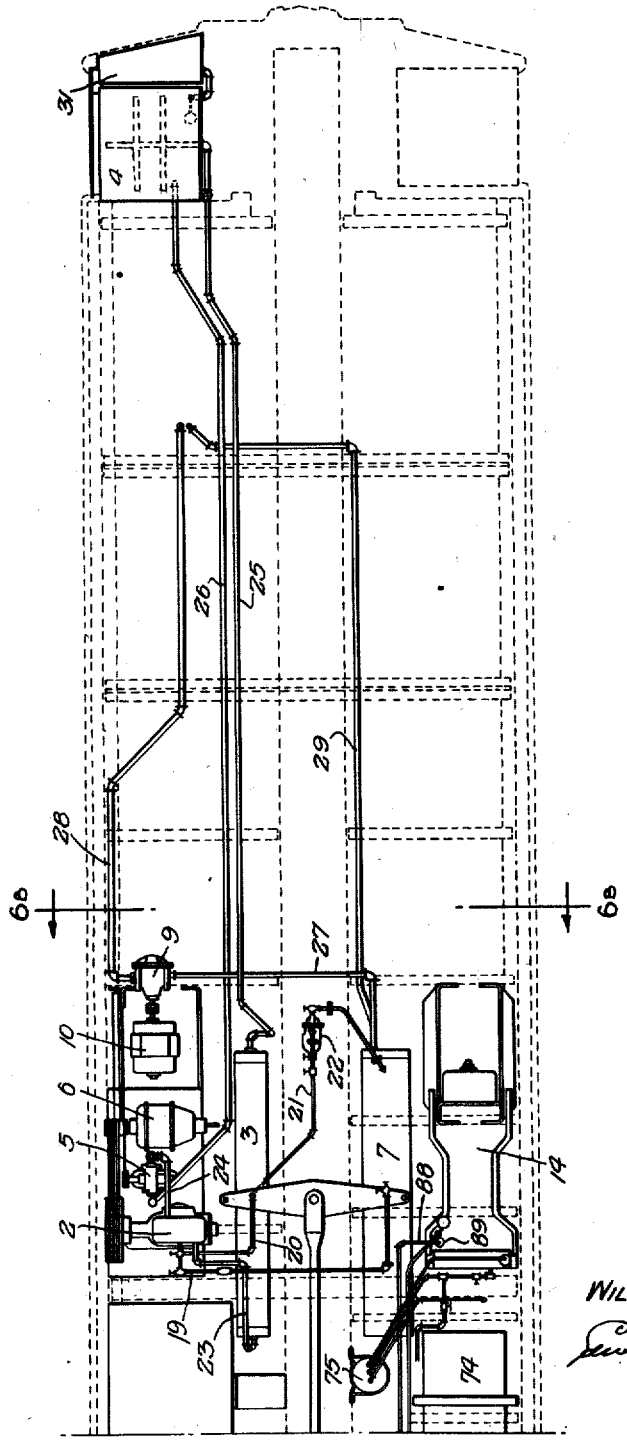

Oct. 11, 1932.  W. B. WHITSITT  1,882,537

AIR CONDITIONING APPARATUS FOR PASSENGER CARS

Filed May 4, 1931  18 Sheets-Sheet 4

Inventor
WILLIAM B. WHITSITT.

By
Attorney

Oct. 11, 1932.　　　W. B. WHITSITT　　　1,882,537
AIR CONDITIONING APPARATUS FOR PASSENGER CARS
Filed May 4, 1931　　　18 Sheets-Sheet 5
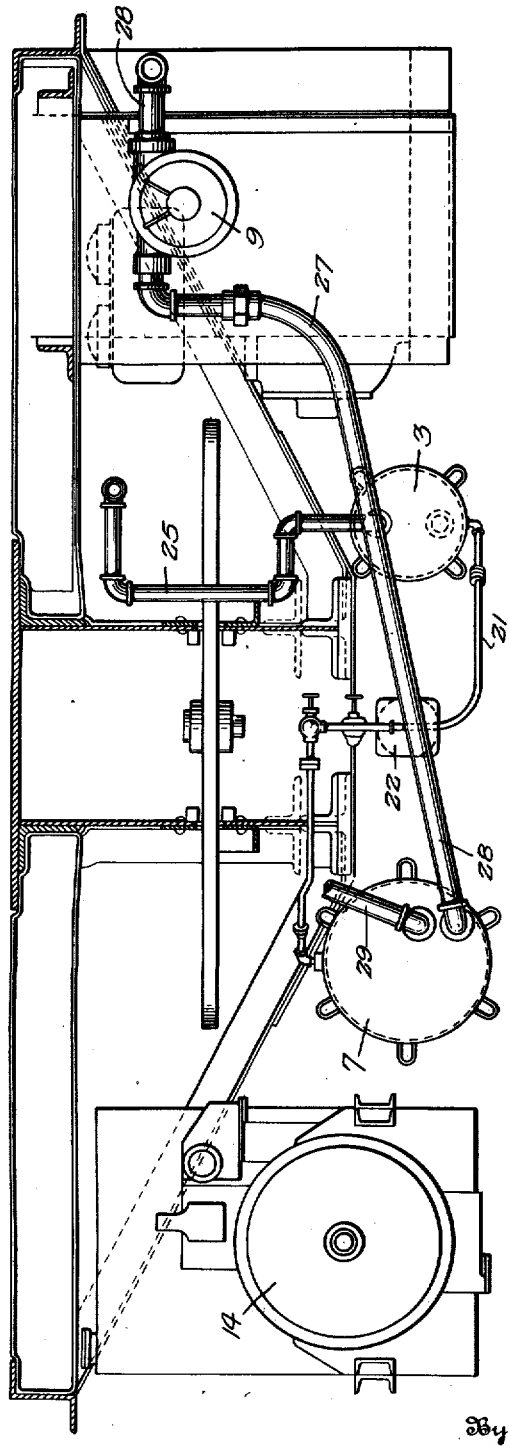
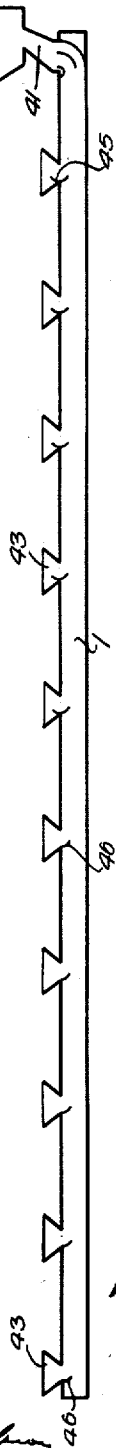
Inventor
WILLIAM B. WHITSITT.
By
Attorney Oct. 11, 1932.  W. B. WHITSITT  1,882,537
AIR CONDITIONING APPARATUS FOR PASSENGER CARS
Filed May 4, 1931  18 Sheets-Sheet 6
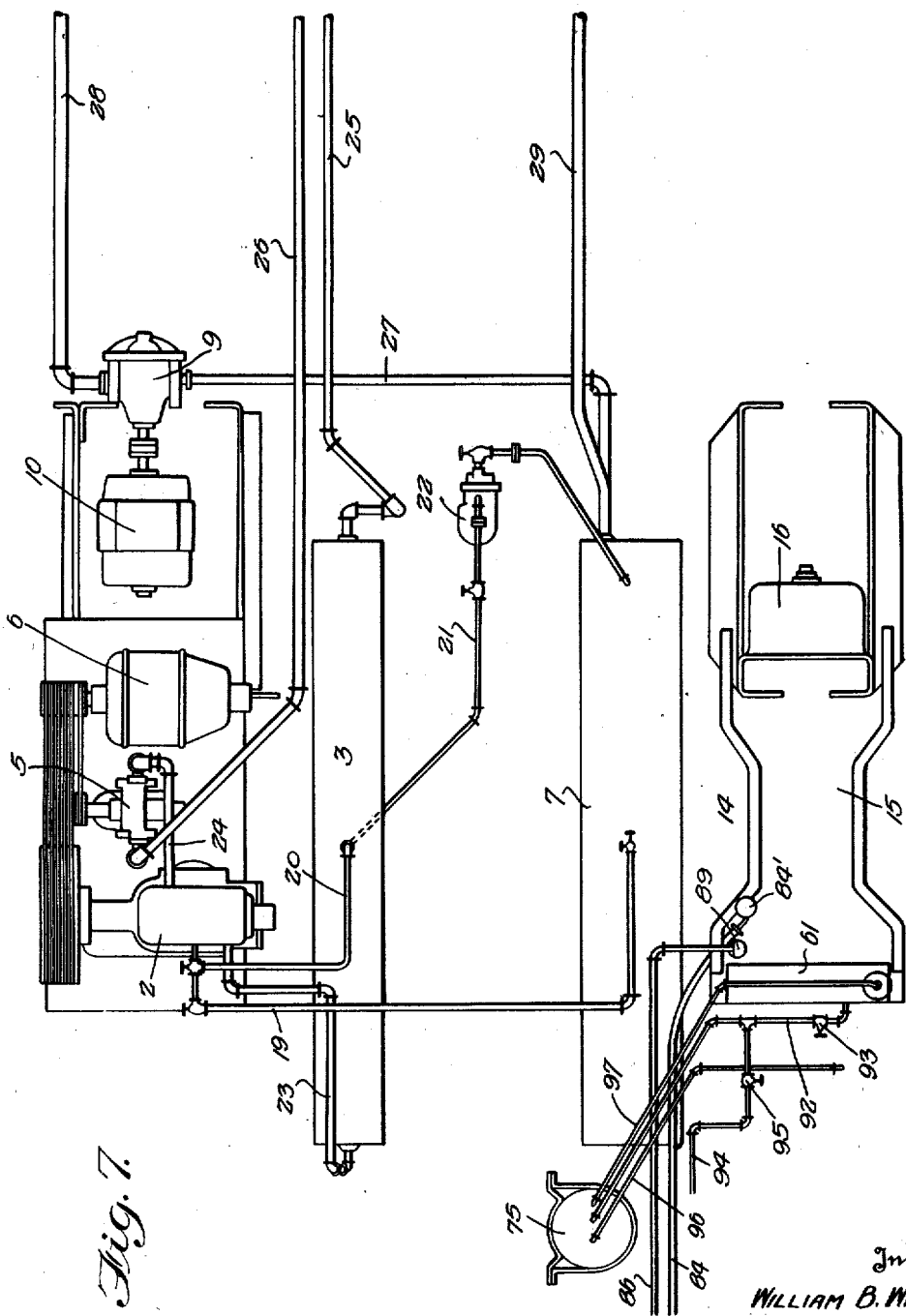

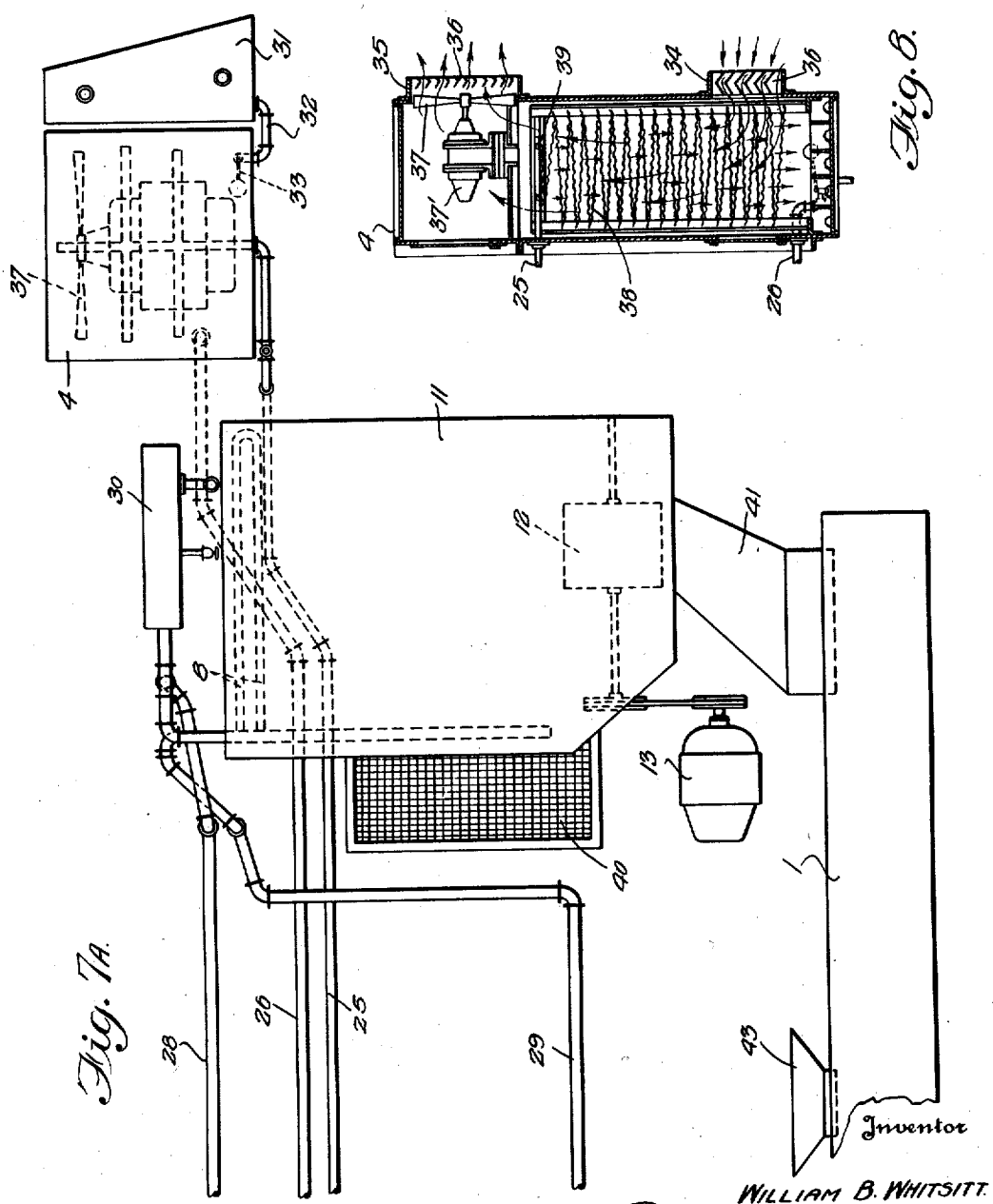

Oct. 11, 1932.  W. B. WHITSITT  1,882,537
AIR CONDITIONING APPARATUS FOR PASSENGER CARS
Filed May 4, 1931    18 Sheets-Sheet 8

Inventor
WILLIAM B. WHITSITT.
By
Attorney

Oct. 11, 1932.   W. B. WHITSITT   1,882,537
AIR CONDITIONING APPARATUS FOR PASSENGER CARS
Filed May 4, 1931   18 Sheets-Sheet 9
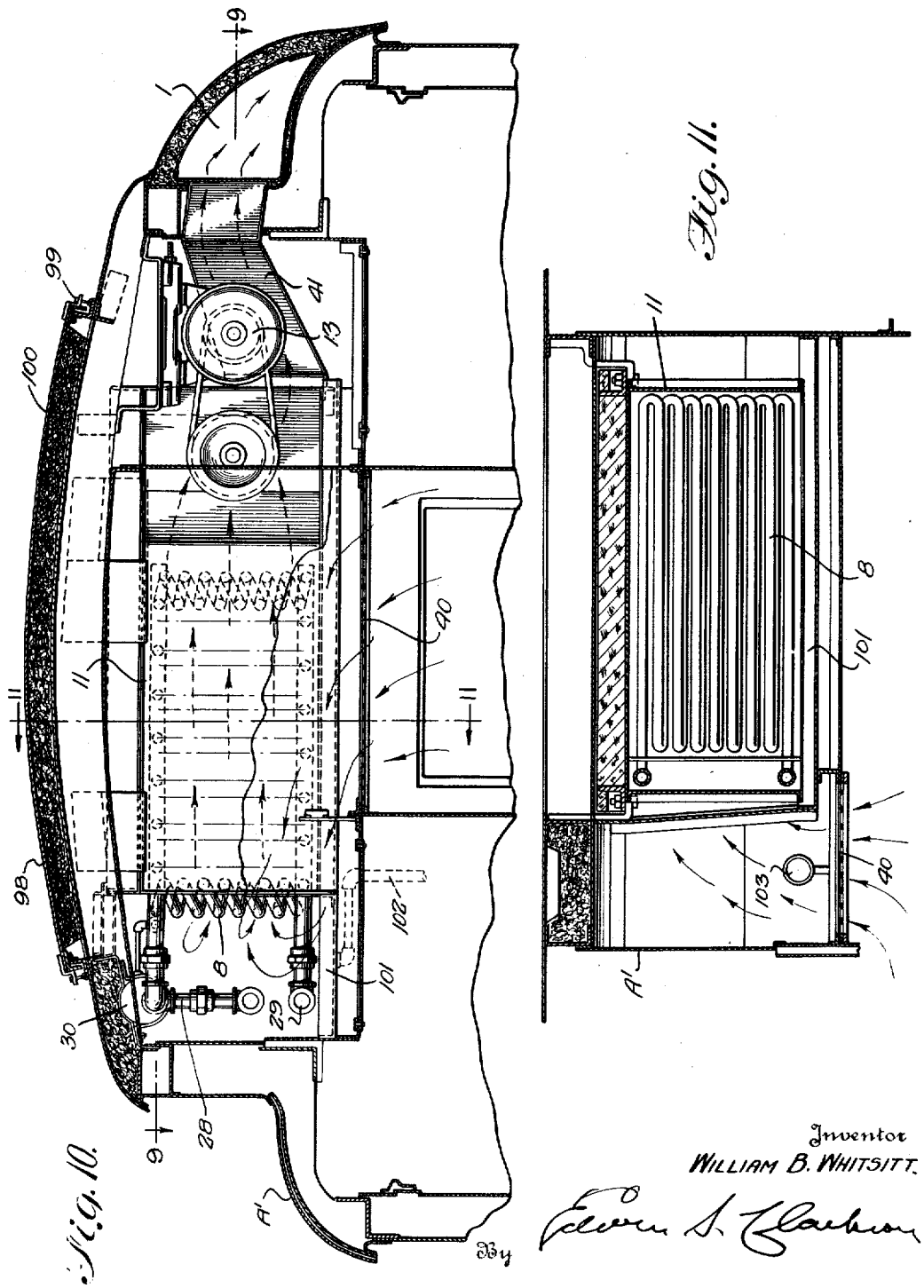
Inventor
WILLIAM B. WHITSITT.
By
Attorney

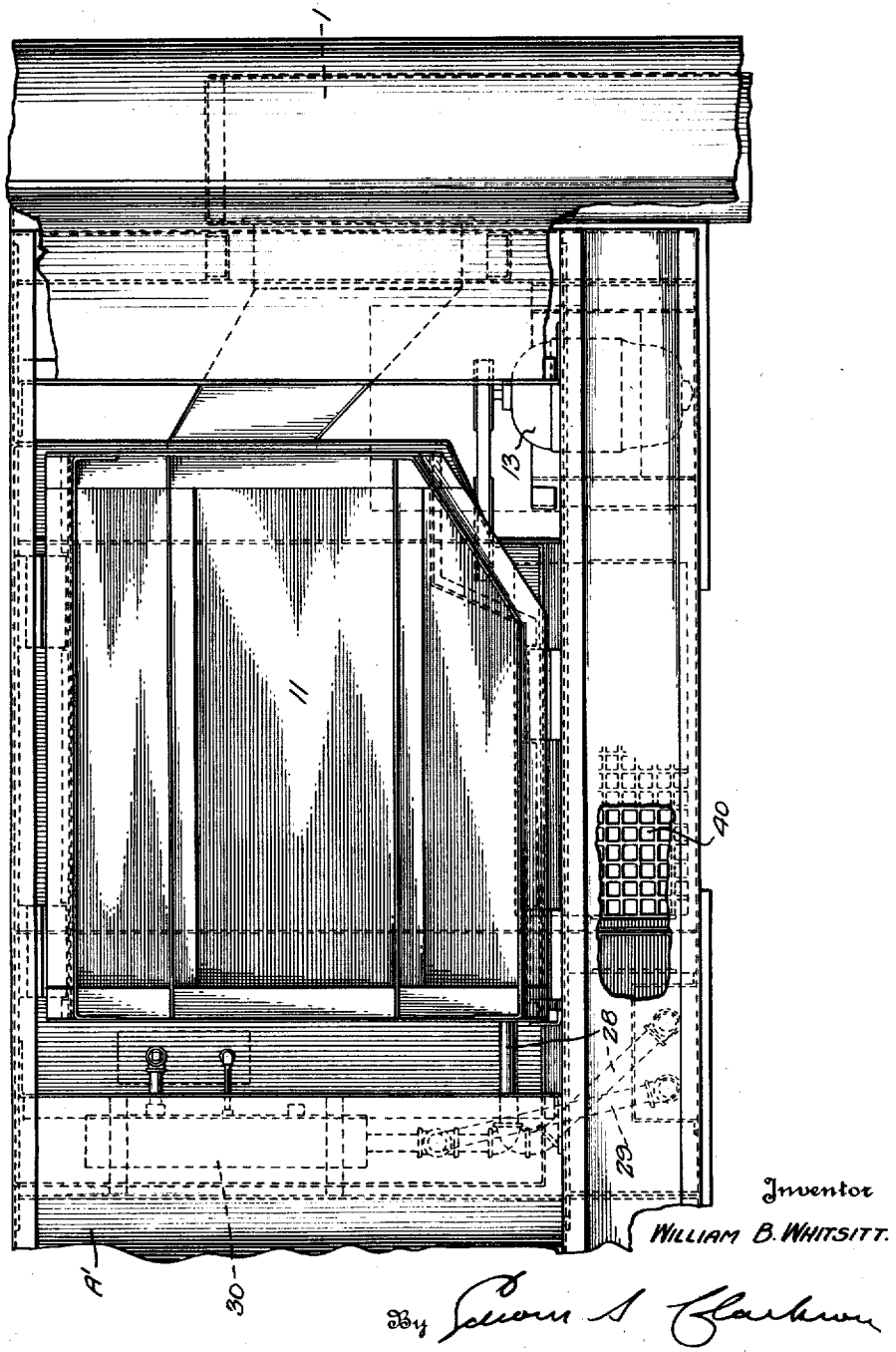

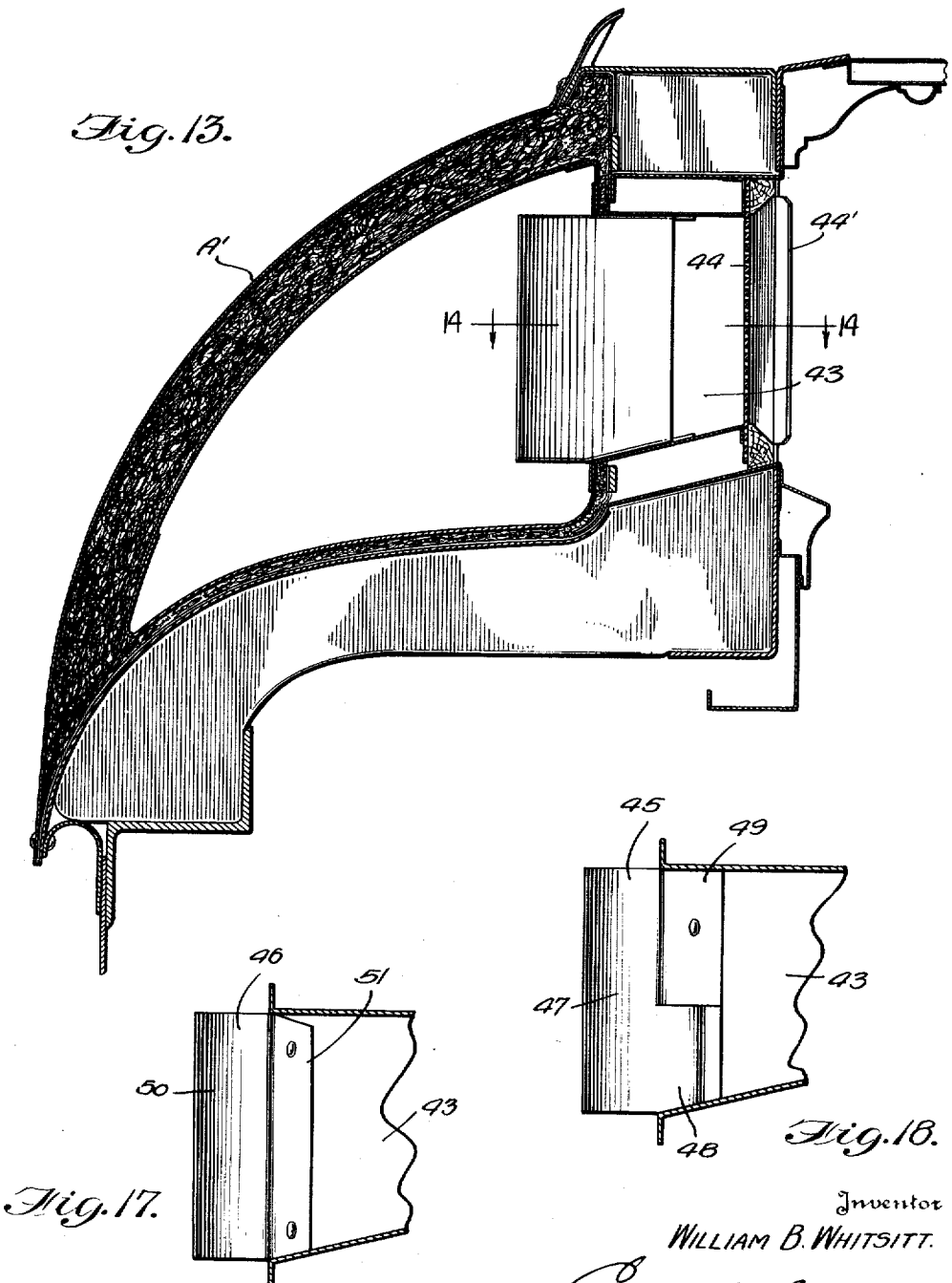

Oct. 11, 1932. W. B. WHITSITT 1,882,537
AIR CONDITIONING APPARATUS FOR PASSENGER CARS
Filed May 4, 1931 18 Sheets-Sheet 12

Inventor
WILLIAM B. WHITSITT

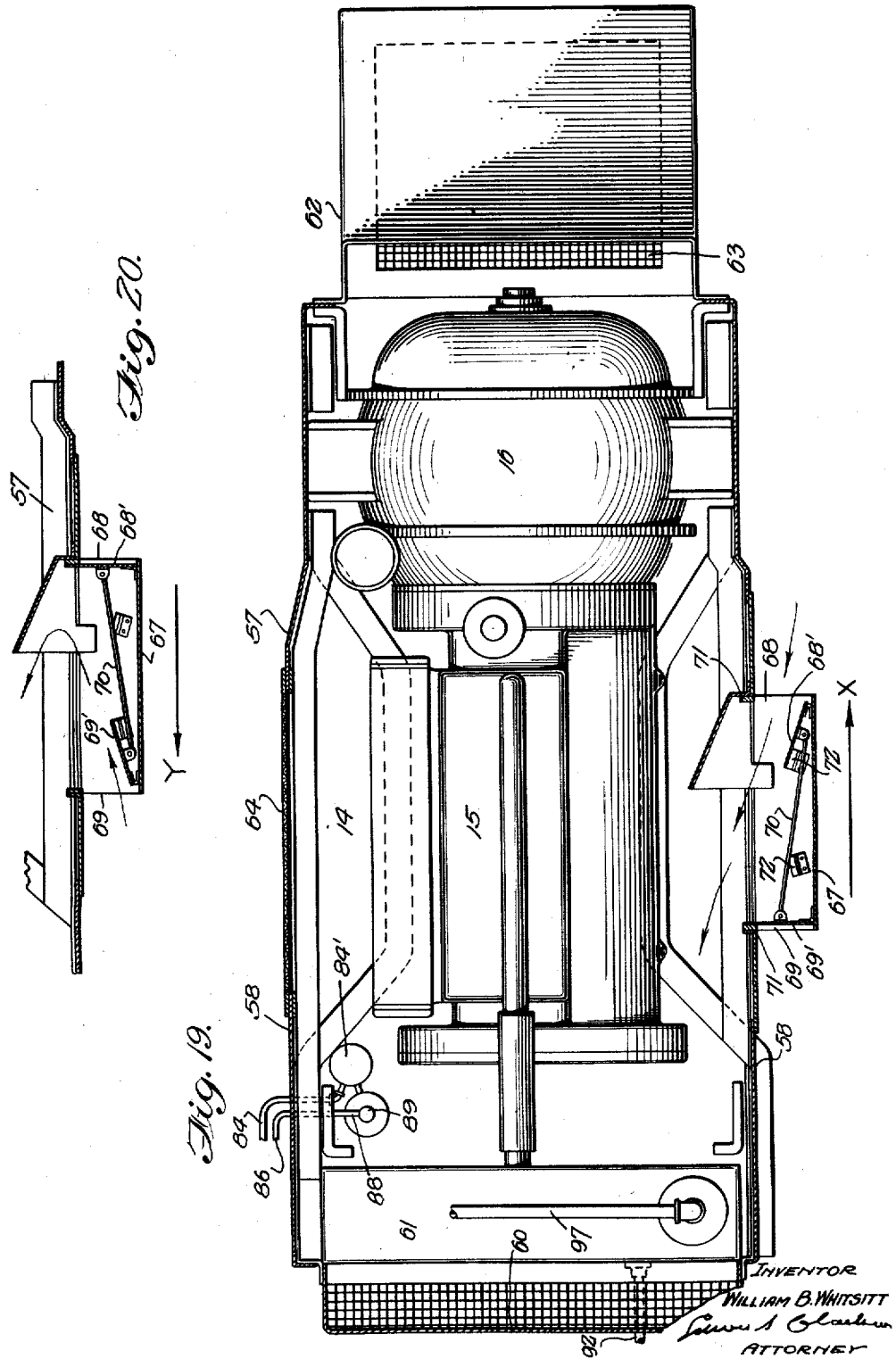

Oct. 11, 1932. W. B. WHITSITT 1,882,537
AIR CONDITIONING APPARATUS FOR PASSENGER CARS
Filed May 4, 1931 18 Sheets-Sheet 14
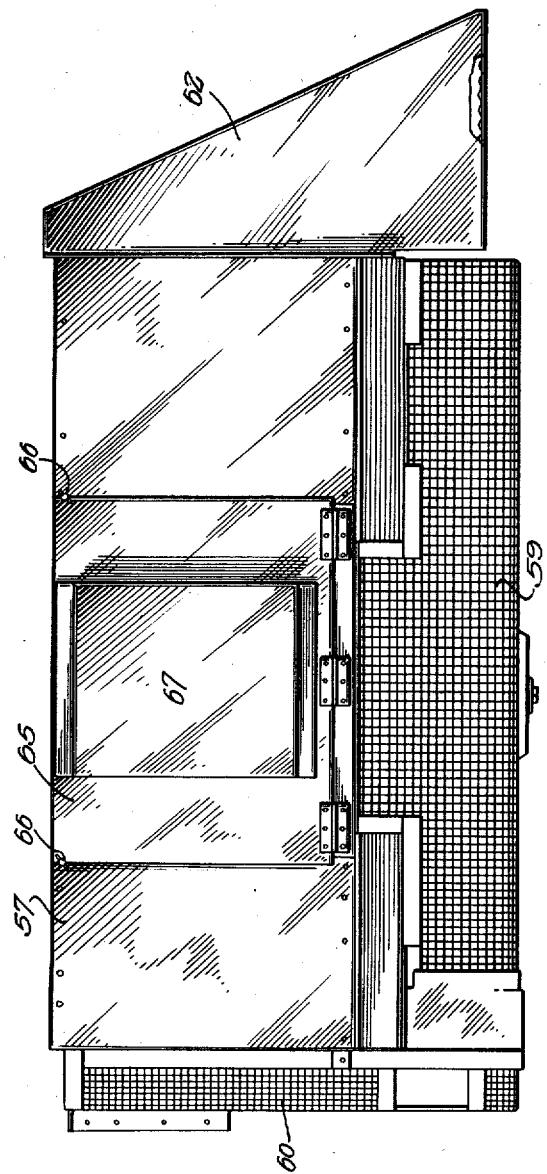
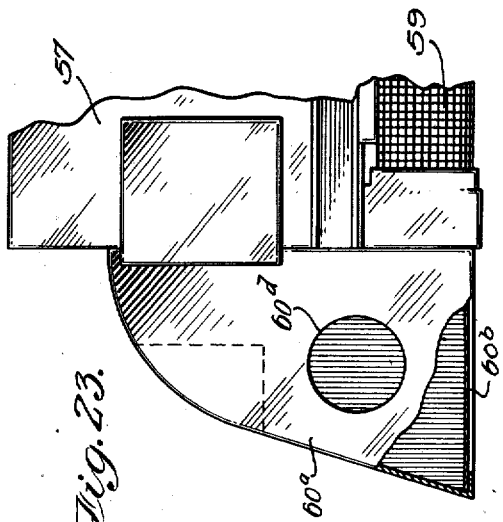
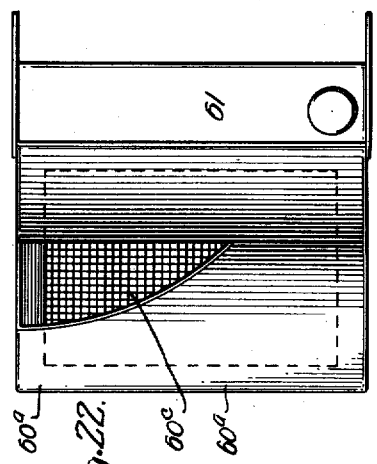
Inventor
WILLIAM B. WHITSITT.

Oct. 11, 1932.  W. B. WHITSITT  1,882,537
AIR CONDITIONING APPARATUS FOR PASSENGER CARS
Filed May 4, 1931  18 Sheets-Sheet 15

Inventor
WILLIAM B. WHITSITT
By
Attorney

Oct. 11, 1932. W. B. WHITSITT 1,882,537
AIR CONDITIONING APPARATUS FOR PASSENGER CARS
Filed May 4, 1931 18 Sheets-Sheet 17

Inventor
WILLIAM B. WHITSITT.

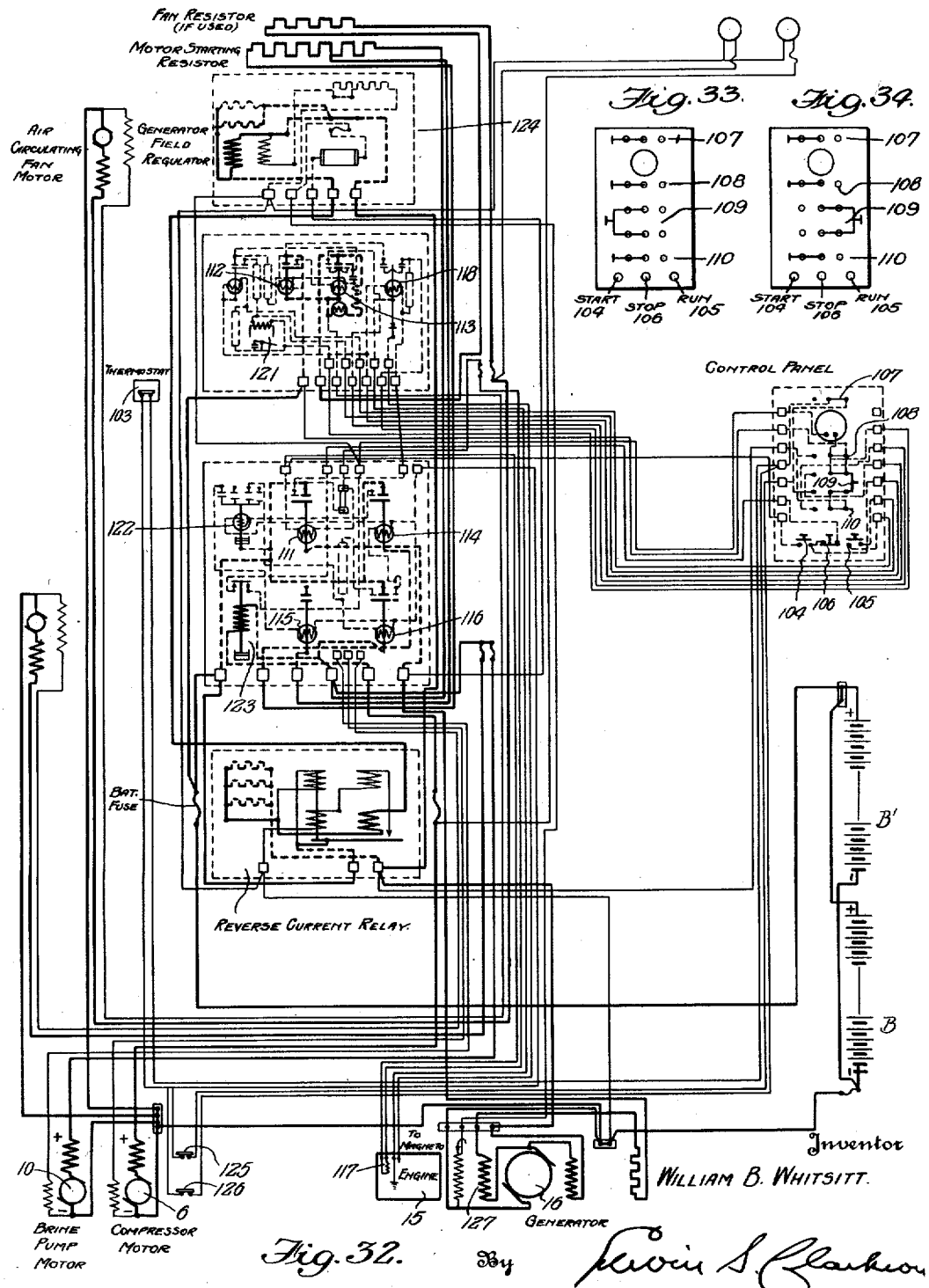

Patented Oct. 11, 1932

1,882,537

UNITED STATES PATENT OFFICE

WILLIAM B. WHITSITT, OF BALTIMORE, MARYLAND

AIR CONDITIONING APPARATUS FOR PASSENGER CARS

Application filed May 4, 1931. Serial No. 534,995.

This invention relates to an air conditioning apparatus for railway passenger cars.

One object of the invention is to provide a simple, reliable and efficient apparatus for regulating the temperature and humidity of the air in a car and circulating the air while eliminating all objectionable drafts.

A further object of the invention is to provide an air conditioning apparatus having its working elements operated and governed by a source of primary electric or mechanical energy independent of the usual electric or mechanical equipment of a car, whereby it is possible to operate the air conditioning equipment at any and all times, whether the train is in motion or standing, or in an isolated yard where other sources of electric current or mechanical power are not available.

Still another object of the invention is to provide an air conditioning apparatus employing an internal combustion motor as a primary source of energy, and means acting, in the event of accidental injury or leakage of the fuel supplying means for the motor, to render the fuel non-inflammable or to extinguish escaping portions of fuel which may have become ignited, in order to obviate the liability of a conflagration and consequent damage to the car.

Still another object of the invention is to provide means acting in the event of the escape of motor fuel and its ignition, and governed by the action of the extinguishing agent, for effecting an operation of the air brake mechanism to bring the train in which the air conditioned cars are arranged to a stop.

Still another object of the invention is to provide an air conditioning apparatus which can be installed on existing cars at a low cost and without marring the interior finish of the car, and which can be applied to new cars when building at a cost very little, if any, in excess of what the same car would cost equipped with ordinary bulkhead and ceiling fans.

Still another object of the invention is to provide an air conditioning apparatus of such simple, reliable and efficient design that its operation and maintenance can be easily taken care of without requiring the services of specially trained men.

Still another object of the invention is to provide an arrangement for distributing conditioned air at intervals throughout the length of the passenger compartment of a car at one side of the car only, whereby ordinary upper deck ventilators at the opposite side of the car may be used for ventilating purposes in the ordinary manner in case the air conditioning apparatus of the car should, from any cause, become inoperative.

Still another object of the invention is to provide means whereby conditioned air may be properly supplied uniformly, and without annoying drafts, throughout the length of the passenger compartments of cars having passenger compartments of different lengths, whereby the apparatus is rendered available for use on coaches, diners, combination cars, sleepers, and other cars of a train having passenger compartments varying in size, whereby the automatic air conditioning of all the cars of a solid train is rendered possible.

Still another object of the invention is to provide a novel construction and arrangement of parts for cooling and regulating the temperature and humidity of air supplied to a passenger car and circulating the air throughout the car, whereby an apparatus for obtaining and carrying out the foregoing objects of the invention in a certain and reliable manner is produced.

With the above and other objects in view, the invention consists of the features of construction, combination and arrangement of parts, hereinafter fully described and claimed, reference being had to the accompanying drawings, in which:—

Fig. 1 is a diagrammatic top plan view of a railway coach showing in dotted lines the seats and compartments of the coach and parts of the new air conditioning apparatus applied thereto.

Fig. 2 is a view in side elevation of the same.

Fig. 3 is a view similar to Fig. 1, showing the application of the invention to a dining car.

Fig. 4 is a side elevation of the same.

Fig. 5 is a view similar to Figs. 1 and 3, showing the application of the invention to a combination railway car, such as a combination coach and baggage car.

Figs. 6 and 6a are plan views conjointly showing the foundation brake and air conditioning equipment layout underneath the car, the latter appearing in dotted lines.

Fig. 6b is a vertical transverse section on line 6b—6b of Fig. 6.

Figs. 7 and 7a are plan views conjointly showing essential elements of the air conditioning apparatus on an enlarged scale.

Fig. 8 is a vertical transverse section through the cooling tower.

Fig. 9a is a diagrammatic plan view of the air distributing conduit and deflector baffle arrangement to secure even distribution of air in the car.

Fig. 10 is a vertical transverse section taken substantially on line 10—10 of Fig. 9.

Fig. 11 is a vertical longitudinal section through the air conditioning unit taken on the line 11—11 of Fig. 10.

Fig. 12 is a plan view looking from above toward the car roof and the parts shown in Figs. 9, 10 and 11, with the trap door removed.

Fig. 13 is an enlarged vertical transverse section through the air duct on the line of one of the air outlets and associated baffles or deflectors taken, for example, on the line 13—13 of Fig. 14.

Figure 14:
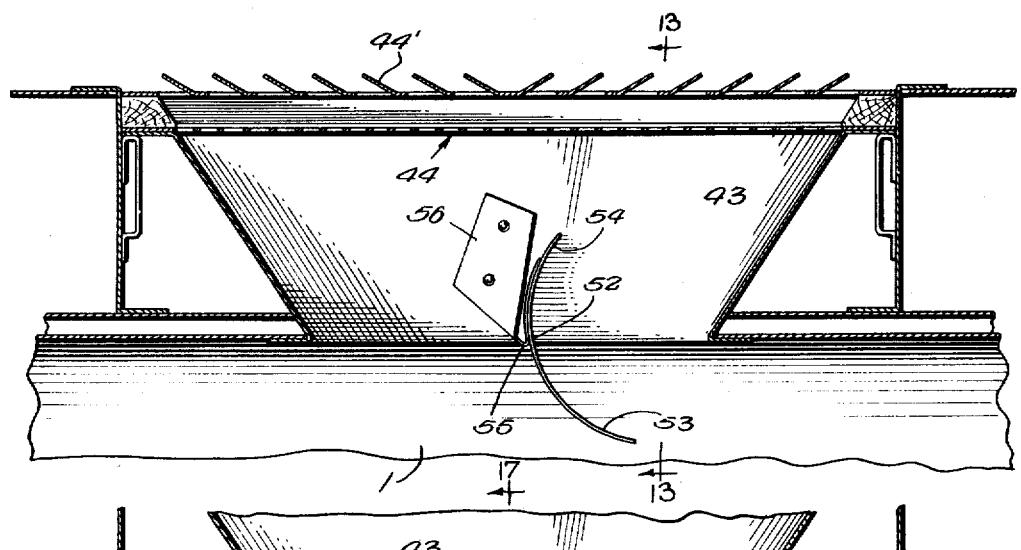
Fig. 14 is a horizontal section taken on line 14—14 of Fig. 13.
Figure 15:
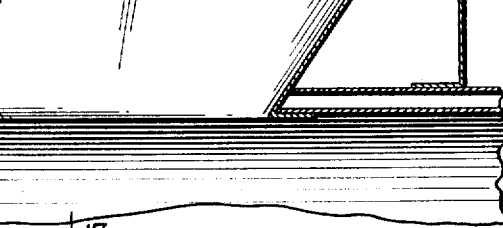
Figs. 15 and 16 are views similar to Fig. 14 showing different arrangements of baffles or deflectors for use at different points in the length of a car having a long passenger compartment.
Figure 16:
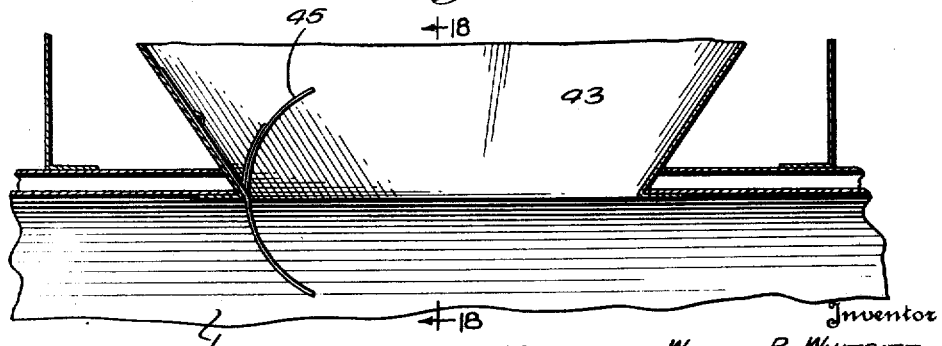

Figs. 17 and 18 are sections corresponding to Fig. 14 taken on lines 17—17 and 18—18 of Figs. 15 and 16, respectively.

Fig. 19 is a plan view of the internal combustion engine generator set or unit, showing the engine air intake nozzle and reversible duplex damper controlling the same in position for admission of air when the car is running in one direction.

Fig. 20 is a view of the engine cooling air intake nozzle showing the damper in position for admitting air when the car is running in the opposite direction.

Fig. 21 is a side elevation of the parts shown in Fig. 19.

Fig. 22 is a top plan view of the engine radiator and a modified form of radiator guard.

Fig. 23 is a side elevation of the parts shown in Fig. 22.

Figures 24, 25:
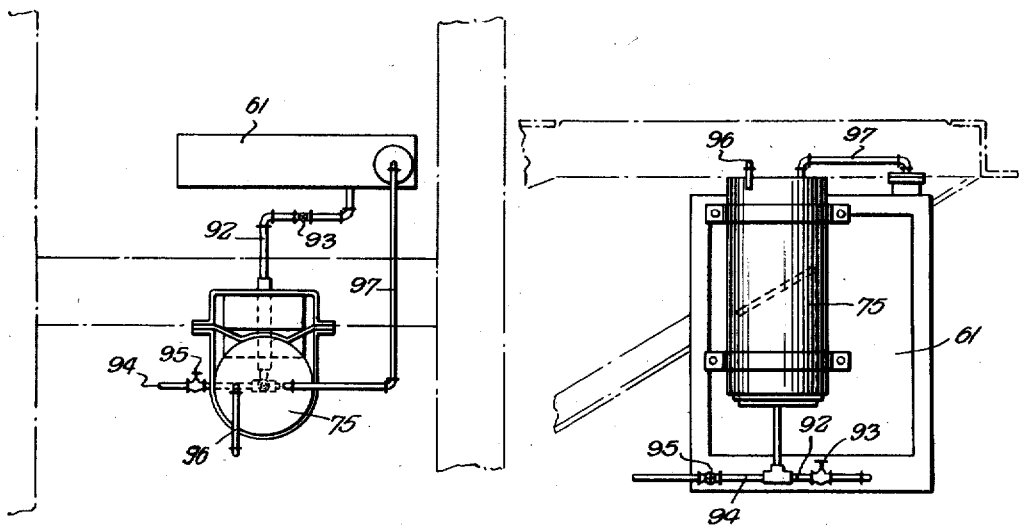

Fig. 24 is a top plan view showing the arrangement of the engine radiator, engine radiator cooling water supply tank, and connecting pipes.

Fig. 25 is a front elevation of the same.

Figure 26:
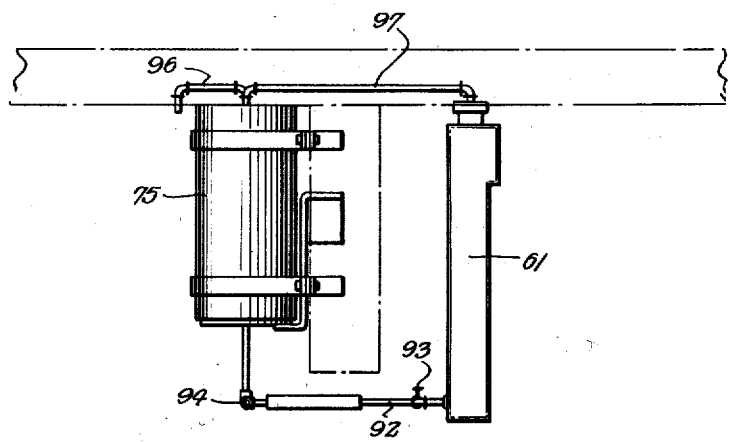

Fig. 26 is a side elevation of the parts shown in Figs. 24 and 25.

Figure 27:
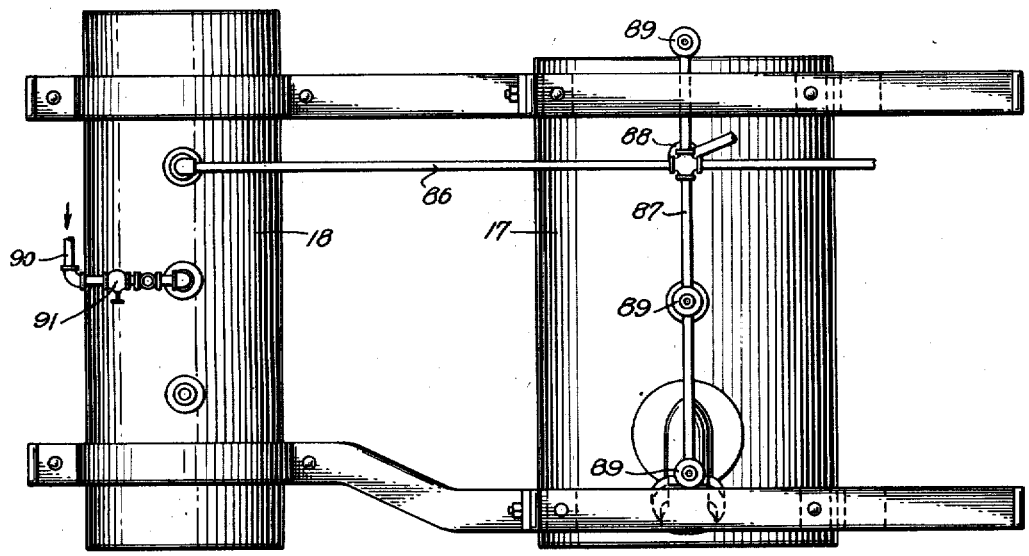

Fig. 27 is a top plan view showing the gasoline and carbon tetrachloride supply tanks and their supports and connections.

Figure 28:
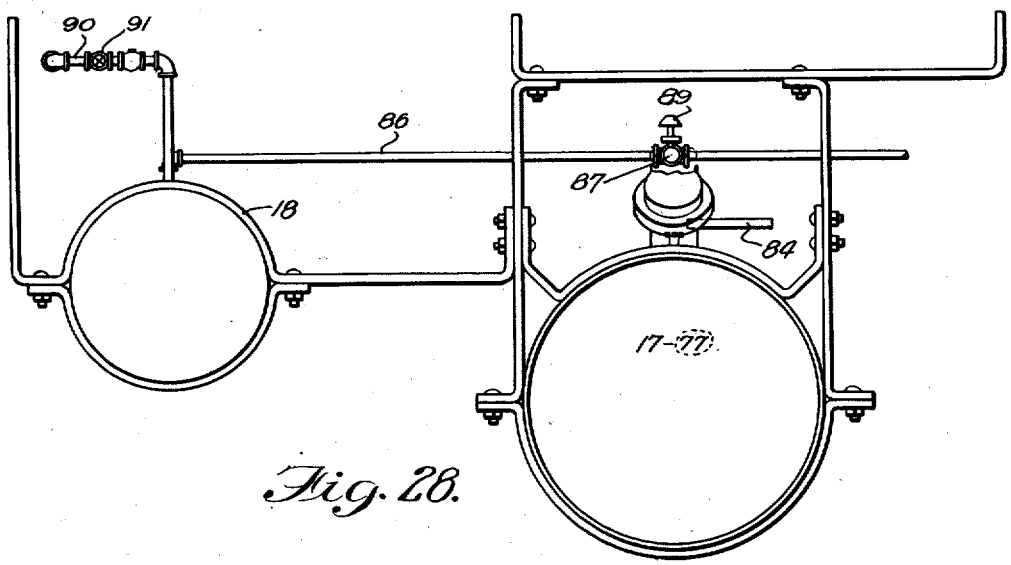

Fig. 28 is a view in elevation of the same.

Figure 29:
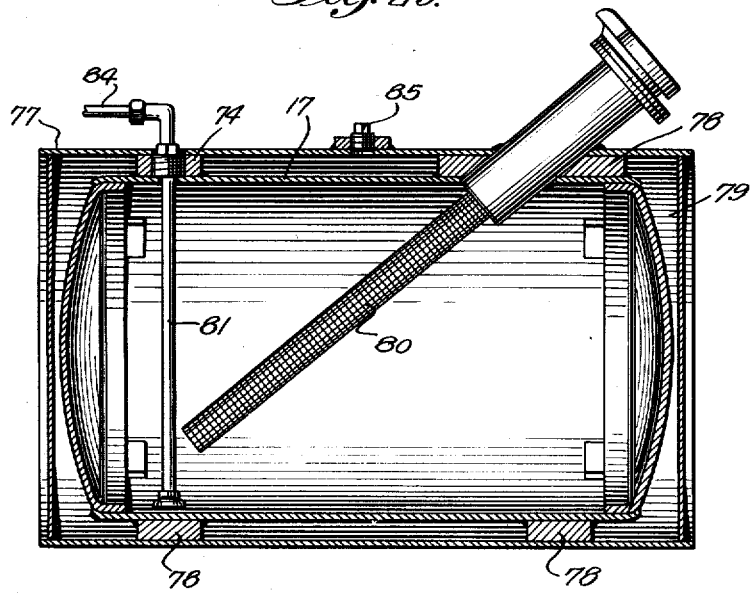

Fig. 29 is a longitudinal section through the gasoline supply tank and its guard jacket or casing.

Figures 30, 31:
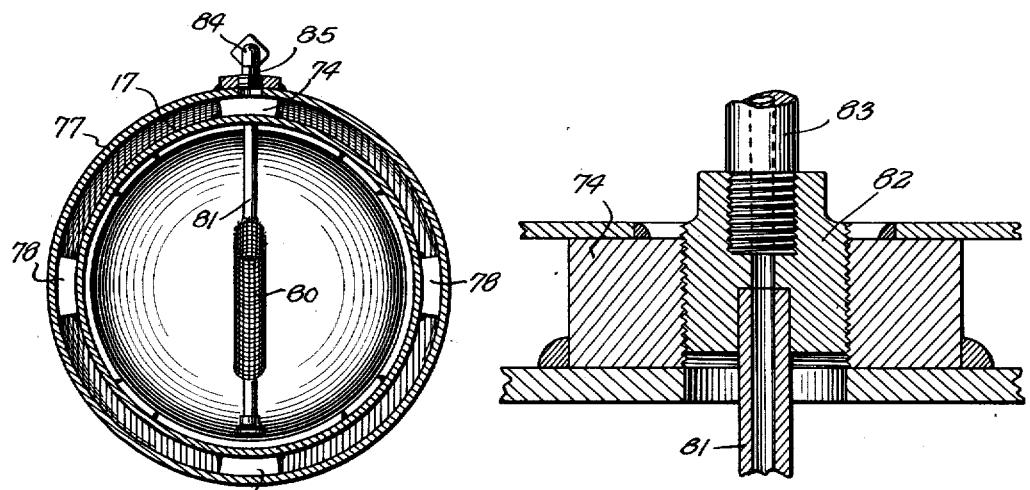

Fig. 30 is a vertical transverse section thereof.

Fig. 31 is a sectional view showing the plug or union connection between the feed pipe sections of the tank shown in Figs. 29 and 30.

Fig. 32 is a diagrammatic view showing the electric circuits of the apparatus.

Figs. 33 and 34 are views showing positions of the switches for regular operation of the cooling equipment.

While the apparatus employed will be in general the same regardless of the type of car to which it is applied, two different arrangements are preferably employed and disclosed herein, one for use in coaches, diners or other single-type cars in which, because of lack of space or for greater convenience, the air conditioning unit is disposed over the ceiling in the upper deck at one end of the car and a cooling tower for cooling the refrigerant condensing water is placed in the vestibule of the car, and the other for use in combination coach and baggage or other combination-type cars in which, because of space afforded or for greater convenience, the air conditioning unit and cooling tower are placed in the baggage compartment of the car. Variations are also employed in the arrangement of baffles or deflectors associated with the outlets of the distributing ducts of cars having passenger compartments of different lengths in order to prevent drafts and to secure a uniform distribution of the air within the car.

Referring now more particularly to the drawings, Figs. 1 and 2 show a railway passenger car A of coach type, the same having a passenger compartment extending practically continuously between toilet compartments at the opposite ends of the car and in which passenger compartment the seats $a$ are arranged; Figs. 3 and 4 show a dining car A' divided into kitchen, pantry and dining compartments $a$, $a^2$ and $a^3$, respectively, the compartment $a^3$ having the usual arrangement of dining tables $a^4$ and seats $a^5$ and constituting the passenger compartment of the diner; and Fig. 5 shows a combination type of car, to wit, a combination coach and baggage car $A^2$ having a passenger compartment $a^6$ in which seats $a^7$ are arranged and a baggage compartment $a^8$. Both kinds of cars, that is to say, what may be termed the single-type cars, namely the coach type car A and diner type car A', and coaches of combination-type, such as combination coach and baggage car A², are preferably provided with the double-sashed windows $a^9$ which are designed to remain continuously closed while the air conditioning apparatus is in operation. In accordance with my invention the passenger compartment of the car, which may extend only a part of the length of the car, as in case of the compartments $a^3$ of Figs. 3 and 4 and $a^6$ of Fig. 5, is preferably provided at one side only with a longitudinally extending air distributing duct 1, the ordinary manually controlled upper deck ventilators $a^{10}$ being employed at the other side of the passenger compartment of the car and also, if desired, at one or both sides of other compartments of the car for ventilation purposes, that is, which are opened at desired or required times to discharge vitiated air or required times to discharge vitiated air and to allow outside fresh air to enter and commingle with the air being circulated in the car. The object of providing the double-sashed windows and keeping the same closed while the air conditioning apparatus is in operation is, of course, to prevent entrance of dust, soot, cinders and other foreign matter and to isolate the conditioned air from contamination by the external air. By locating the distributing duct 1 at one side only of the passenger compartment and employing the usual upper deck ventilators at the other side of the passenger compartment, an efficient distribution of the conditioned air, by reason of the structural features hereinafter described, may be obtained, while the usual manually controlled ventilators are left available for use in case the air conditioning apparatus of the car should at any time become inoperative.

Figure 6A:
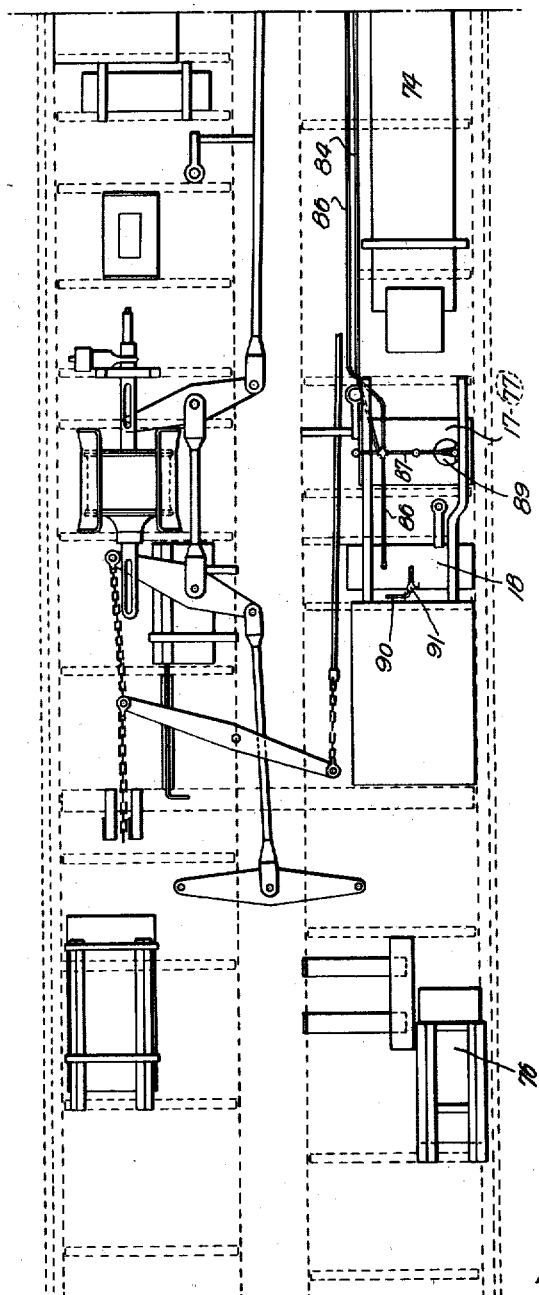

The air conditioning apparatus is illustrated generally and more or less diagrammatically in Figs 7 and 7a and is also illustrated in part in Figs. 6 and 6a showing the foundation brake and air conditioning mechanism located underneath the car. The apparatus embodies the following individual units:

1. A refrigerant unit employing ammonia or other refrigerant and comprising a refrigerant compressor 2, a refrigerant condenser 3, a cooling tower 4 for cooling the refrigerant condenser water, and a condenser water circulating pump 5, said pump 5 and compressor 2 being driven by an electric motor 6.

2. A cooling liquid carrier and circulator comprising a cooling tank 7 for brine or other cooling liquid, cooling coils 8, a pump 9 for circulating the cooling liquid through the carrier 7 and the coils 8, and an electric motor 10 for driving the pump 9.

3. An air cooling unit for cooling and dehydrating the air including the coils 8, a cooling or conditioning box, chamber or compartment 11 in which said coils 8 are arranged, one or more fans 12 for drawing the air upwardly from the passenger compartment into the chamber 11 at one side and forcing the air through the coils 8 in said chamber and out from the chamber at the opposite side into the distributing duct 1, and an electric motor 13 for driving said fan or fans.

4. An internal-combustion-engine-generator-set 14, including the engine motor 15 and the generator motor 16, for furnishing electric current at the proper voltage and amperage to ensure operation of the air conditioning apparatus at all times, whether the car is in motion or stationary, and which may be employed in connection wth a storage battery or accumulator separate from or forming a part of the ordinary electric current supply circuit of the car.

5. A fuel supply and fire extinguishing unit comprising a tank or reservoir 17 for holding gasoline or other similar fuel and a tank or reservoir 18 operatively associated therewith and with the engine generator unit for holding and supplying through suitable means a fire extinguishing fluid, such as carbon tetrachloride. This fuel supply and fire extinguishing unit includes means automatically operable to supply the carbon tetrachloride so as to automatically extinguish any fire which may accidentally occur at the gasoline storage tank or around the internal combustion engine generator 14. The fuel supply and fire extinguisher unit further includes a safety factor means automatically set into action on the operation of the carbon tetrachloride supply means for causing the actuation of the air brakes to bring the train to an immediate stop.

The refrigerant compressor 2 has connected therewith suitably valved suction and discharge pipes 19 and 20. The suction pipe 19 connects the compressor with the ammonia or other refrigerant outlet of brine cooling tank 7, while the ammonia delivery pipe 20 connects the compressor with the inlet of ammonia condenser tank 3, to the outlet of which condenser tank 3 is connected a suitably valved delivery pipe 21 connected at its discharge end with the brine cooling tank 7. In the pipe 21 is arranged a float-controlled expansion valve 22 of suitable construction for governing the supply of the refrigerant to the brine cooling tank 7. The parts 2, 19, 20, 21 and 22 thus providing for the circulation, when the compressor is in action, of the refrigerating liquid which on its passage through valve 22 expands in the brine cooling tank 7, thus cooling the brine in said tank, and is withdrawn therefrom in its heat-laden vaporized condition into the compressor and compressed thereby and liquefied by the cooling water in coil in tank 3.

The tank 3 is arranged in a water circulating and cooling circuit including an outlet pipe 23 connecting said cooling coils with the cooling jacket of the compressor 2, a discharge pipe 24 connecting the cooling jacket of the compressor 2 with the pump 5, a suction pipe 26 connecting the pump 5 to the cooling tower 4, in which the condenser cooling water is cooled, and a return pipe 25 connecting the outlet of the condenser 3 to the inlet of cooling tower 4, whereby in the operation of pump 5 the warmed water from tank 3 will be pumped to the cooling tower and cooled therein and then returned to the tank 3 for the purpose of abstracting the heat from the refrigerant therein. The construction and operation of the cooling tower 4 will be fully hereinafter described.

The brine tank 7 is included in a circuit comprising an inlet pipe 27, through which the cooled brine is forced thereto from the pump 9, a suction pipe 28 leading to the pump from the outlet end of the coil 8 in the air cooling unit or conditioner, and a delivery pipe 29 leading to the inlet end of said coil 8 back from the tank 7, the operation of the pump 9 by the motor 10 thus causing a constant flow of the cooled brine through the coil 8 for air cooling and dehydrating purposes. A surge drum or expansion tank 30, of suitable type and construction, is provided in the pipe 28 between the same and the coil 8, and above the level of the coil, so as to provide a receptacle at the highest point in the system to ensure the separation from the liquid of all air and its collection at one point.

In coaches and diners, as shown in Figs. 1 to 4, inclusive, the air cooling unit is preferably placed above the ceiling at the center of the car and near one end of the car, as in Figs. 1 and 2, or near one end of the passenger compartment thereof, as in Figs. 3 and 4, while the cooling tower 4 and an associated water supply tank 31 are placed in the vestibule of the car at one side of the doorway. In combination cars, of the type shown in Fig. 5, having a baggage or other storage compartment, as compartment $a^8$, the air cooling unit, cooling tower 4 and tank 31 may be disposed within the baggage compartment. The tank 31 may be supplied with water from air pressure water supply tanks on the car or in any other preferred manner. This tank is connected through a pipe 32 controlled by a float valve 33 with the bottom of the cooling tower for the purpose of maintaining a desired level of water therein and to supply water therefrom through pipe 26 to the tank 3 for replenishment purposes when required.

The cooling tower 4 comprises a casing having a lateral air inlet 34 just above its bottom and a lateral air outlet 35 adjacent to its top, said inlet and outlet being each provided with an arrangement of louvres or vanes 36 for checking the velocity of the air flowing therethrough and to ensure the flow of the air in line streams upwardly through the casing between the inlet and the outlet, the air being drawn into said casing by the action of an electric fan 37, driven by motor 37′, positioned in the top of the casing adjacent the outlet. Disposed within the casing between the inlet and outlet is a reticulated screen barrier, formed by a series of wire netting baffles 38 arranged in a zig-zag manner. A spray-head or nozzle 39 is located in the cooling tower above the series of baffles and is connected with the pipe 25, whereby the warm water from the tank 3 is broken up into a fine spray or mist and allowed to trickle slowly down over the series of perforated baffles. This water in its downward travel meets the current of air drawn upwardly through the baffles by the action of the fan 37, whereby the water in its fine spray or misty condition is rapidly cooled and flows to the bottom of the tower at a reduced temperature and is returned to the tank 3 again for the purpose of cooling the refrigerant therein. The float valve 33 located in the bottom of the tower keeps the condenser cooling water at a proper level therein and automatically operates to replace with fresh water from tank 31 the small amount of water which is unavoidably blown out from the cooling tower as an invisible mist.

The chamber 11 of the air conditioning unit is in communication with the passenger compartment of the car through a grille 40 in the car ceiling of the passenger compartment of the car, and air drawn upwardly through this grille by the action of the fan or fans 12 passes into one side of the chamber 11 and flows between the elements of the coil 8 to the opposite side of the chamber 11 and is discharged at the latter-named side of the chamber by the action of the fan or fans 12 into a supply flue or conduit 41 from which it is delivered into the adjacent inlet end of the distributing conduit 1. This inlet end of the conduit is provided with curved baffles or guide plates 42, Fig. 9, to effect an easy entrance of the air into the conduit 1 in line streams and without the production of eddy currents.

The conduit 1 extends the full length of the passenger compartment of the car at one side thereof and is provided at regular intervals with air discharge outlets or nozzles 43 preferably of flaring form. Each of these outlets is provided at its inner or discharge side with a screen 44 to divide the air into streams and to prevent eddy currents, as well as to reduce the velocity of the air at its point of entrance. Each outlet 43 is also provided on the inside of the screen 44 with a plurality of louvres or shutters 44' arranged in fan formation or inclining from the center of the outlet toward opposite ends of the car so as to cause a desirable diffusion of the entering currents of air. It is also necessary in practice to provide means for arresting the flow of the air, which enters the conduit 1 at considerable velocity from the conduit 41, and to prevent it from traveling too rapidly and banking at the far end of the distributing conduit, as well as to effect an equal distribution of the air to all the discharge nozzles throughout the length of the distributing conduit. Where the passenger compartment of the car, as in coach A, is lengthy, baffle plates or deflectors 45 and 46 of the types shown in Fig. 9a and in Figs. 16–18 and 15–17, respectively, may be employed. As shown in Fig. 9a the conduit 1 is illustrated as provided with ten outlet nozzles 43, and the first five nozzles of the series between the supply nozzle 41 and the center of the passenger compartments are provided with the baffles 45, while the five nozzles more remote from the supply nozzle 41 are provided with the baffles 46. Each baffle 45, as shown, comprises a transversely curved or trough-shaped plate disposed with the center of its concave face bearing centrally against the far side of the outlet 43 and having its portion projecting into the conduit 1 forming a full-length baffle wing 47 and its portion extending into the outlet 43 divided to form a lower half-length baffle wing or lower deflecting portion 48 and an upper attaching flange 49 whereby it is fastened to the wall of the conduit. Each baffle 46 on the other hand is provided with a full-length baffle wing 50 projecting into conduit 1 and is devoid of the half baffle wing 48 provided at the inner side of each baffle 45, being provided at its inner side simply with a full-length attaching flange 51 whereby it is secured in position.

With this arrangement of the two sets of baffles 45 and 46, it will be seen that the baffles 45 each present a larger area of air checking surface than the baffles 46, and consequently the velocity of the air will be checked to a greater extent by the baffles 45 than by the baffles 46 and thus that half of the compartment nearest the source of air supply will be prevented from getting more than its due amount of air, while the half of the compartment more remote from the source of supply will be ensured its proper supply of air, the air flow to the outlets being so differentially proportioned by the action of these sets of baffle plates that all portions of the car are supplied alike with the same quantity of air and at substantially the same velocity. The air entering through the nozzles is further checked by the action of the baffles and so guided by the louvres that a uniform distribution of the air throughout the passenger compartment is obtained without any drafts whatever being felt by the occupants of the car.

Figure 9:
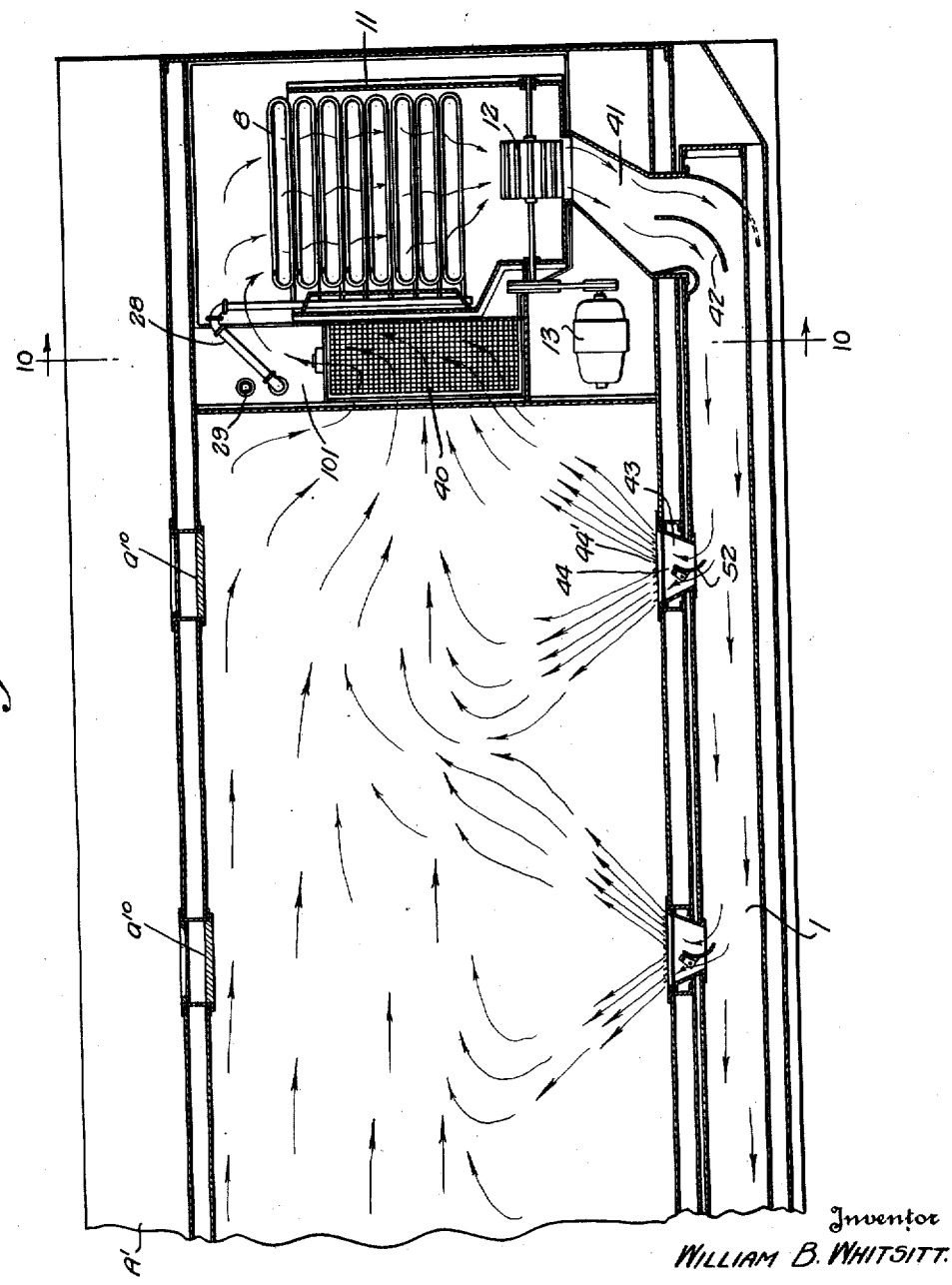
Fig. 9 is a horizontal transverse section through the portion of a car containing the air conditioning unit, taken substantially on line 9—9 of Fig. 10.

The construction and arrangement of the baffles 45 and 46 above described while suitable and desirable for use in a coach or car with a long passenger compartment, is not suitable for use on dining and combination cars having short passenger compartments, where the number of discharge nozzles is limited and a special construction and arrangement of the baffles must be employed in order to secure an even distribution of the air from the conduit 1 to the nozzles. In a dining car for example there may be only five discharge nozzles 43 and, owing to the high velocity of the air, baffle plates 52 of the construction and arrangement shown in Figs. 9 and 14 are preferably employed. Each of these baffle plates consists of a trough-shaped plate member having full-length inner and outer wings 53 and 54 projecting respectively into the duct 1 and nozzle 43, the wing 54 being provided on its convex side with a bracket piece 55 with angularly bent end portions 56 adapted to be fastened to the bottom and top walls of the nozzle. The baffles 52 each present a large extent of surface for checking the velocity of the air current, and the degree of the checking and deflecting action of each baffle is dependent upon its position between the end walls of the nozzle. The first baffle 52 of the series, as shown in Figs. 9 and 14, is arranged approximately at the center of the nozzle opening, while the next nozzle of the series, as shown in Fig. 9, is placed a little further from the center of the nozzle and closer to the rear wall of the nozzle, considered in the direction of flow of the air, and the nozzles of the series thus, beginning with the first nozzle, lie at the vertical center of the opening and successively recede therefrom toward the rear wall of the nozzle. The first baffle therefore acts as a partition dividing the nozzle into two passages of substantially equal size for the flow of the air, and the succeeding baffles likewise divide their nozzles into two passages, but of varying widths, the front passages of the nozzles of the series being successively of increased size with respect to the rear passages of the respective nozzles, which are successively of decreased size with respect to each other. Thus the forward nozzles while acting on air of greater velocity than the remaining nozzles will allow no greater amount of air to pass in the same given period of time and a differential distributing action is established to distribute the air in proper proportion to all the nozzles. By this means and by employing screens and louvres of the constructions previously described an equal amount of air may be supplied to all portions of a short passenger compartment without drafts or causing other annoying or disagreeable objections.

The internal combustion engine and generator set is mounted with the fuel feed tank or reservoir and certain water supply tanks or reservoirs upon the underframe of the car. In order to protect the engine generator set from injury by flying missiles in the travel of the train, said engine generator set is enclosed by a protective housing 57. This housing is preferably constructed of side walls 58 (and a top wall if desired) of sheet metal, a bottom screened guard wall 59, of spring screen wire, an end screened guard wall 60, forming a guard for the radiator 61, and an opposite end guard 62 in the form of a downwardly flaring air intake hood communicating at its inner side above its bottom with the housing, said hood being of flaring form toward its bottom and having at its bottom a wire screened air intake opening 63. If desired, one of the side walls 58 may be provided with a ventilation opening covered by a metal screen 64, while the other side wall 58 is provided with an opening normally closed by a hinged door 65 secured in position by a fastening member 66 and which allows access to be obtained to the interior of the housing for inspection, cleaning, repairs or replacement of parts. In the operation of the engine set the cooling air for the radiator is drawn upwardly into the hood 62 into the protective housing, and through the side screen 64, and around the gas engine and through the radiator and out through the radiator guard 60. In order to ensure a positive supply of air to the engine radiator at all times, however, regardless of the direction in which the train may be traveling, there is provided at one side of the protective housing a horizontally disposed air inlet chute 67 normally open at the opposite ends thereof to provide air inlets 68 and 69 and comprising pivoted valve members 68' and 69' coupled for conjoint action by a link or similar connection 70, the valve members being operable by air pressure in the travel of the car in one direction or the other for opening one of the valves and closing the other valve. Each valve is adapted to close against a rubber or other elastic seat bumper 71 and to rest when open upon a suitable supporting bracket 72. When the car is traveling in the direction of the arrow marked X in Fig. 19 valve member 68' is moved by air pressure to uncover the opening 68, while valve member 69' is moved to close the opening 69 so that air will be drawn into the housing through the opening 68 facing in the direction of motion of the car. When the car is traveling in the opposite direction, as indicated by the arrow marked Y in Fig. 20, valve member 69' is moved by air pressure to uncover the opening 69 and valve member 68' is moved to cover opening 68, so that air will enter the housing through an opening 69 facing in the direction of travel of the car. Hence a supply of air is taken into the protective housing, regardless of the direction in which the car is moving, to supplement the air taken in through the hood 62 and screen 64, so that a positive supply of an adequate amount of air will be furnished to the engine and engine radiator. Instead of employing the wire screen radiator guard 60 as above described a funnel-shaped sheet metal guard 60ª of the form shown in Figs. 22 and 23 may be used, said guard having bottom, top and side openings 60ᵇ, 60ᶜ and 60ᵈ, which may be screened or not, as desired, to allow free air intake and discharge actions according to the direction of travel of the car.

Mounted on the car underframe is the tank 17 for supplying gas or other liquid hydrocarbon fuel to the engine, the tank 18 for holding carbon tetrachloride or other fire preventing liquid, a tank 75 for replenishing the radiator and cooling jacket of the engine with cooling water, and tanks or reservoirs 74 and 76 for holding water under air pressure for supply to the water service system of the car and to the water containing elements of the air conditioning system if required. The tank 17 is of special construction, as shown in detail in Figs. 29, 30 and 31, being provided with a strong sheet metal enclosing guard jacket or casing 77 spaced therefrom by spacing members 74 and 78 so as to leave a space or chamber 79 between the two tanks. This space or chamber is normally filled with the carbon tetrachloride or other fire preventing liquid so that, in case the inner tank 17 should be punctured in an accident, the outer case would also become punctured and any fuel escaping from the inside tank would mix with the charge of tetrachloride in the outside tank and form a non-combustible mixture, thus avoiding liability of fire hazard. The tank 17 is provided with a suitable filling tube 80 and has arranged therein a feed tube 81 extending from a point near the bottom to and outwardly through an opening in the top thereof and secured in a plug 82 fitted in a threaded opening of the distance pieces 74 welded to the tanks. In said plug 82 is also fitted an elbow or outlet connection 83 coupling the tube 81 to a feed pipe 84 leading to the carbureter of the engine. The charge of fire extinguishing liquid in the space or chamber 79 is supplied thereto through an opening in the top of the tank 77 which is normally closed by a plug 85. It will be evident that this construction of the fuel tank ensures against the burning of the fuel and starting of a fire in the event of damage to the tank and escape of the fuel therefrom.

The tank 18 is designed to contain carbon tetrachloride or other fire preventing liquid up to a normal predetermined level. From a point near the bottom of this tank upwardly through the tank extends a carbon tetrachloride feed pipe 86 which connects with a spray pipe or sprinkler head 87 overlying the tank 17—77 and continues therefrom toward the engine generator and terminates in a spray pipe or sprinkler head 89 overlying or disposed in working proximity to the engine carbureter. The sprinkler pipes or spray heads 87 and 88 are equipped with automatic sprinkler nozzles 89, such as of Grinnell type, having a valve opening upon the fusion of fusible material at a certain temperature, whereby the fire preventing liquid is allowed to escape and is sprayed upon the part to be protected. With this arrangement it will be seen that in the event that there should be any leakage of the hydrocarbon fuel from the tank 17 or carbureter, and the escaping fuel should take fire, the automatic sprinkler valves will be opened to effect the spraying of the leaky elements with a liquid which will immediately extinguish the flames. The apparatus will, accordingly, be amply safeguarded in the use of a primary motor using a combustible fuel against liability of a fire taking place on account of fuel leakage, as means will be automatically and instantaneously set into action to extinguish the flames and prevent passage of the same to combustible portions of the car. A pipe 90 containing a controlling and cut-off valve 91 is provided for connecting the tank 18 with a train pipe or some other suitable part of the air brake system of the car, so that the carbon tetrachloride liquid will be normally maintained under a pressure of at least one hundred pounds, namely the pressure in the train line, whereby a reliable and certain pressure feed of the liquid to the automatic sprinkler heads is ensured when the sprinkler nozzles are opened for action. This pipe connection 90 is also provided for the purpose of causing a reduction of pressure in the train line simultaneously with the opening of the sprinkler heads for the purpose of setting the air brakes of the train into action to stop the train. By this means the train will be brought to a quick stop soon after any rupture of the fuel supplying means or material escape of fuel and its ignition occurs, to prevent possibility of scattering of the fuel and the starting of a conflagration thereby. This stopping of the train will also advise the train crew that something is wrong with the engine fuel supply means, so that immediate repairs may be made.

The tank 75 is connected at its bottom with the lower portion of the engine radiator 61 by means of a filling pipe 92 having a controlling and cut-off valve 93 therein. This pipe in turn may be connected by a pipe 94 having a controlling and cut-off valve 95 therein with the tank 76 or other suitable source of water supply, whereby the radiator and tank 75 may be replenished with water whenever required. An overflow pipe 96 connects with the tank 75 at a suitable distance below its top for the purpose of draining off any water above a certain level and constantly leaving an air filled space at the top of the tank. A vent pipe 97 connects the top of the radiator 61 with this air filled space of tank 75, which space serves as an expansion chamber coacting with the vent pipe to allow escape from the radiator of any steam and water which may boil over from the radiator, together with any excess water which may be supplied at any time through pipe 92, whereby provision is made to condense the steam and collect waste water from the radiator and to keep the radiator supplied and prevent it from becoming exhausted of water in the event that the engine should become temporarily overheated.

By reference to Figs. 10 and 12 it will be noted that the air drum is located directly within the outlet end of the air cooling chamber in which the cooling coil 8 is located, and that an opening is provided in the car roof above this chamber to permit ready and convenient access thereto for introduction and removal of parts therein and their cleaning and repair whenever occasion requires. This opening must be closed absolutely airtight in the operation of the air conditioning system to prevent external air being mixed with the air being cooled. For this purpose a tight-fitting metal covered door or hatch 98 is provided. This cover seals the opening in an air-tight manner, is detachably secured in position by swing bolts or other suitable fastenings 99, and is provided with an insulation filler of cork or other suitable insulating material 100 to prevent heat radiation.

The relative humidity of the air in the car is maintained between fifty and sixty percent by the stream of air passing over the cooling coils 8 in the cooling unit. These coils are of relatively large area and the stream of air passes over them at a comparatively slow speed, so that, in passing over these coils, the moisture in the air condenses and flows down to the bottom of the air cooling compartment into a drain pan 101 from which the water may flow out through a drain pipe 102 to the ground. It has been found unnecessary, after a great many tests, to provide another automatic control of the humidity other than that provided by the moist warm air coming in contact with the cooling coils.

The temperature of the air inside the car is controlled by a thermostat 103 which is arranged in a passage 101' in the line of flow of the air stream between the grille 40 and the intake end of the air cooling chamber. This thermostat is in the nature of a contact making and breaking thermometer which is operative to stop the refrigerant compressor and brine circulating pump to arrest the cooling or refrigerating action of the air when the air in the car reaches any predetermined low temperature, which may be at any set point between 60 and 80° F., without interfering with the action of the air circulating fan or fans, which will continue to operate. Thus when the temperature of the air in the car goes below the maximum low degree, the thermostat will act to automatically stop the cooling action, while the air continues to circulate through the passenger compartment of the car and the cooling chamber of the cooling unit. When the temperature again rises to a certain degree the thermostat will close an electric circuit to again set the compressor and brine circulating pump into operation to re-establish the air cooling action. The thermostat in practice may be so adjusted for opening and closing a relay circuit as to adapt the refrigerant compressor and brine circulating pump to be thrown into and out of operation so as to maintain the air in the car at a substantially uniform temperature at all times, or within a range of 3° F., more or less, between minimum and maximum.

It will thus be understood that in the operation of the apparatus air, taken from the passenger compartment of the car, will be drawn by means of the air circulating fans into the air cooling compartment or unit, there cooled by contact with the air cooling coils, and then forced from said cooling compartment or unit into a distributing duct, from which the air is distributed at intervals to different portions of the car along its length, the baffles, screens and louvres associated with the air discharge nozzles or outlets operating differentially on the flowing column of air in the duct to properly apportion the air to the different nozzles so as to effect the supply of a uniform amount of conditioned air to the passenger compartment at all portions thereof without causing objectionable drafts or other annoyances or disturbances. When the apparatus is in operation the cooling action will be such that, no matter how high the normal external atmospheric temperature is, the temperature of the air within the car will be maintained at a desired degree, between 60° and 80°, and this air will be of a proper degree of humidity and free from dust, dirt, cinders and other foreign materials. Should the temperature of the air in the car fall too low, or below a predetermined low degree, the operation of the cooling mechanism will be automatically stopped and the air will simply circulate for a ventilating action until the temperature again rises to a predetermined degree, when the cooling mechanism will be again thrown into operation, so that a substantially uniform degree of temperature of the air within the passenger compartment will be maintained at all times. In the rarely possible event that the apparatus should, from any cause, be made inoperative, the arrangement of the distributing duct at one side only of the passenger compartment of the car, and the provision of the ordinary ventilators at the opposite sides of the car, will allow of the use of the latter for ventilating purposes until operation of the air conditioning mechanism may be resumed.

It will thus be seen that recirculated air from the passenger space of the car flows upwardly through the recirculated air inlet or grille 40 into a passage 101' which extends transversely of the car on the inner side of the compartment 11 and communicates with the intake end of the compartment 11 at one side of the car, the air thence flowing through the compartment 11 and over the coils 4 and then discharging through the conduit 41 at the outlet end of the compartment 11 at the opposite side of the car. The flow of the air through compartment 11 is, therefore, in a direction transversely of the car, which is a desirable and important feature, as this arrangement of the compartment 11 allows an air cooling compartment of greater length and a cooling coil of greater surface area to be employed in the available space in the roof zone at the car end than is practicable by the use of a compartment and coil arranged for the travel of the air in a direction longitudinally of the car without encroaching on the roof space of the main passenger compartment. Hence a larger volume of air may be cooled during any given period and the air passing over a cooler of generous size may travel slowly and be exposed for a longer period to the cooling action of the coil 8, by which means a better cooling and humidifying action may be obtained, as will be readily understood.

Figs. 32, 33 and 34 are views showing the electric circuits, relays and contactors. The circuits include, besides the batteries B and B', the generator 16, the motors 6, 10, 13 and 37', the thermostat 103, and the necessary wiring, "Start", "Run" and "Stop" push buttons 104, 105 and 106, control switches 107, 108, 109 and 110, contactors 111, 112, 113, 114, 115 and 116, a magnet choke coil 117, relays 118, 119, 120, 121, 122 and 123, a field regulator 124, high and low pressure cut-outs 125 and 126, and a generator cranking coil 127.

Contactor 111 connects battery circuit to engine generator cranking field and choke coil, contactor 112 connects the air circulating fan motor 13 to battery, contactor 113, which is an accelerating contactor, cuts out the armature resistance as the motor speed builds up, contactor 114 starts the compressor motor 6, brine pump motor 10 and cooling tower fan motor 37', contactor 115, which is also an accelerating contactor, cuts out the first step of resistance of armatures of motors 6, 10 and 37', and contactor 116 which, like the contacts 113 and 115 is an accelerating contactor, cuts out the second step of the resistance of armatures of motors 6, 10 and 37', magnet choke coil 117 closes carbureter choke on internal combustion engine for starting only, relay 118 opens and closes ground circuit on engine magneto, the reverse current relay 119 keeps the engine generator connected by battery as long as generator voltage exceeds battery voltage, otherwise disconnects the generator from the battery, the pilot relay 120 governs the voltage feed to the low voltage relay 121. The low voltage relay 121 operates, when the voltage falls below a safe operating figure, to open the circuit 2 and stops the motors 6, 10 and 37' but does not stop the engine generator. The oil dash pot pilot relay 122 regulates the operation of resistance contactors 115 and 116. The overload relay 123 opens, when compressor motor 6 is overloaded, to stop the gas engine generator and all motors and closes automatically without restarting generator set and motors, which in such cases must be restarted, and field regulator 144 automatically regulates the voltage in the generator field windings.

Fig. 33 shows the position of the switches in the regular operation of the apparatus with all units in service, while Fig. 34 shows the position of the switches when the air circulating fan motor 13 only is running.

To start the engine generator set, the "Start" push button 104 is pushed and held down until the voltage reaches 25, thereby closing contactor 111 and causing relay 118 to operate engine carbureter choke, and thus starting the engine generator and closing reverse current relay 119 when the operating voltage builds up above battery voltage. The starting push button 104 is released as soon as the engine starts, and should not in practice be held down for more than thirty seconds at a time. The release of the starter push button opens contactor 111, thus breaking the battery circuit to the generator cranking coil 127, relay 118 remains closed but the carbureter choke coil solenoid is deenergized and the choke returns to normal position, the engine continues to run and relay 119 remains closed and keeps the generator connected to the battery as long as the generator voltage is higher than the battery voltage. As soon as the generator is in working operation the conditioning equipment may be started by momentarily pressing "Run" push button 105, whereupon all the motors 6, 10, 13 and 37' are put into operation and relays 120 and 121 and contactors 112 and 133 closed, followed by contactor 114, relay 122, contactor 115 and contactor 116. When contactor 116 closes contactor 114, relay 122 and contactor 115 open. In order for these relays and contactors to operate the thermostat 103 must be closed. To stop all equipment, "Stop" push button 106 is pressed, whereupon relays 118, 119, 120 and 121 and contactors 112, 113 and 116 open and the internal combustion engine and all motors stop. To effect the operation of the air circulating fan only, switch 109 is thrown to the right to closed position, while switches 107, 108 and 110 are thrown to the left to closed position, thus arranging the circuits for operating the circulating fan only. To complete the operation the "Run" push button 105 is then pressed momentarily and released, whereupon relays 120 and 121 and contactors 112 and 113 close and air circulating fan motor 13 starts. To stop air circulating fan motor "Stop" push button 106 is pressed, thereby causing relays 120 and 121 and contactors 112 and 113 to open, whereupon the air circulating fan motor stops.

The thermostat 103 can be adjusted to open and close at any suitable low and high temperatures, but may be ordinarily set to open at 72° F. and to close at 75° F. When the thermostat opens it stops motors 6, 10 and 37', but allows motor 13 to continue to run. When the thermostat closes it again sets motors 6, 10 and 37' into action. The purpose of the low pressure cut-out 126 is to prevent injury to the compressor in case of loss of suction. It opens at 25 pounds pressure in the suction line of the refrigerant compressor and thereby stops motors 6, 10 and 37', without stopping motor 13. The high pressure cut-out 125 prevents injury to the compressor in case of excessive pressure. It opens at 225 pounds pressure in the pressure line of the refrigerant compressor and stops motors 6, 10 and 37' without stopping motor 13 and closes at 222 pounds pressure to start motors 6, 10 and 37'. The low voltage relay 121 is designed to open at 28 volts line potential and closes when the voltage builds up, stopping motors 6, 10, 13 and 37', which can not be started again except by operating "Run" push button 105. The overload relay 123 opens the overload of compressor motor 6 only and closes automatically, thus stopping engine generator set and all motors, which can be started only by operating switches 107, 108, 109 and 110 and push buttons 104 and 105 as previously described, thus preventing damage to the equipment.

It will be seen from the foregoing that the apparatus, when once started, will automatically take care of itself, regulating the circulation and humidity of the air and the temperature thereof and varying the operation of the parts of the apparatus as required to maintain a substantially uniform given temperature and degree of humidity of the air. In case of liability of damage to any of the working parts from current conditions in the line, the apparatus will be self-protected and will automatically stop when occasion requires, thus giving notice that something is wrong so that an investigation may be made, and the apparatus can only be started again through a manual operation of the control switches, as fully hereinbefore described. Should the gasoline tank or any of the supply connections be disrupted so as to cause leakage of the gasoline or equivalent fuel liquid the fire extinguishing part of the mechanism will be automatically operated to commingle a non-combustible extinguishing liquid with the hydrocarbon fuel or to spray the extinguishing liquid upon parts coated with the fuel, so as to prevent ignition of the fuel or to extinguish the flames if any have started. At the same time the air brake mechanism of the train will be operated to stop the train to prevent any possibility of spread of the fire, and to enable repairs to be made and safety ensured before the train again proceeds on its way. An important feature of the invention resides in the fact that by the provision of the engine driven generator, current independent of axle driven generators on the train, or outside sources of supply at stations will be furnished to ensure operation of the air conditioning equipment under all conditions and whether or not other sources of current are available.

It will also be seen that the invention provides an air conditioning apparatus which is simple of construction, reliable and efficient in action, and adapted to be applied for use and maintained in operation at a comparatively low cost, and which in these and other respects fully attains the objects of the invention as above set forth.

While the structure disclosed is preferred, it will, of course, be understood that changes in the form, proportions, details of construction and arrangement of parts, to suit different circumstances or conditions in practical use, may be made within the scope of the appended claims without departing from the spirit or sacrificing any of the advantages of the invention.

Having thus described my invention, I claim:

1. Apparatus for conditioning the air in a passenger vehicle comprising means for circulating refrigerant, a cooling compartment in the vehicle located above the level of the space occupied by the passengers, a surface cooler in the compartment receiving refrigerant from said means, said compartment having a recirculated air inlet in its bottom in direct open communication with the upper portion of the passenger space and having an air outlet, the said inlet and outlet being arranged for the horizontal flow of air in the compartment from said inlet and over the surface cooler to the outlet, and means located in said compartment between the cooler and the outlet for drawing air through the inlet and over the surface cooler and then forcing the air through the outlet over the space occupied by the passengers in said vehicle.

2. Apparatus for conditioning the air in a passenger vehicle comprising means for circulating refrigerant, a cooling compartment located in the vehicle above the level of the space occupied by the passengers, a surface cooler in said compartment receiving refrigerant from said means, said compartment having an air inlet in its bottom, an air outlet at one of its sides and a conduit between said inlet and outlet for conducting the air from the inlet horizontally and transversely of the vehicle over the surface cooler to the outlet, and means located in said compartment between the cooler and the outlet for drawing air through the inlet and over the cooler and forcing the air through the outlet over the space occupied by the passengers in said vehicle.

3. Apparatus for conditioning the air in a passenger vehicle comprising means for circulating refrigerant, a cooling compartment located in the top portion of the vehicle and extending transversely of the car, a surface cooler in said compartment receiving refrigerant from said means, said compartment having an air inlet in its bottom communicating with the interior of the vehicle, an air inlet port at one end of said compartment in communication with said inlet in the bottom of the compartment, an air outlet at the opposite end of the compartment, a conduct between the said inlet and outlet of the compartment for conducting the air from the inlet at one end of the compartment horizontally and transversely of the vehicle over the surface cooler to the said outlet, means for drawing air from the vehicle through said inlet, and through the conduit over said cooler and forcing the air through said outlet into the vehicle.

4. Apparatus for conditioning the air in a passenger vehicle comprising means for circulating refrigerant, a cooling compartment located in the top portion of the vehicle and extending transversely of the car, a surface cooler in said compartment receiving refrigerant from said means, said compartment having an air inlet in its bottom communicating with the interior of the vehicle, an air inlet port at one end of said compartment in communication with said inlet in the bottom of the compartment, an air outlet at the opposite end of the compartment, a conduct between the said inlet and outlet of the compartment for conducting the air from the inlet at one end of the compartment horizontally and transversely of the vehicle over the surface cooler to the said outlet, a conduit extending lengthwise of the passenger space of the vehicle, controlled air outlet ports at intervals in said conduit, and means for drawing air through said inlets, through said conduit over the cooler and forcing the air through said outlet into said conduit into the vehicle.

In testimony wherof I affix my signature.

WILLIAM B. WHITSITT.

DISCLAIMER 1,882,537.—*William B. Whitsitt*, Baltimore, Md. AIR CONDITIONING APPARATUS FOR PASSENGER CARS. Patent dated October 11, 1932. Disclaimer filed October 15, 1935, by the patentee.

Hereby enters this disclaimer to that part of the claim in said specification, which is claim 1 of said patent, and in the following words to wit:

"1. Apparatus for conditioning the air in a passenger vehicle comprising means for circulating refrigerant, a cooling compartment in the vehicle located above the level of the space occupied by the passengers, a surface cooler in the compartment receiving refrigerant from said means, said compartment having a recirculated air inlet in its bottom in direct open communication with the upper portion of the passenger space and having an air oultet, the said inlet and outlet being arranged for the horizontal flow of air in the compartment from said inlet and over the surface cooler to the outlet and means located in said compartment between the cooler and the outlet for drawing air through the inlet and over the surface cooler and then forcing the air through the outlet over the space occupied by the passengers in said vehicle."

[*Official Gazette November 5, 1935.*]

tervals in said conduit, and means for drawing air through said inlets, through said conduit over the cooler and forcing the air through said outlet into said conduit into the vehicle.

In testimony whereof I affix my signature.

WILLIAM B. WHITSITT.

DISCLAIMER 1,882,537.—*William B. Whitsitt*, Baltimore, Md. AIR CONDITIONING APPARATUS FOR PASSENGER CARS. Patent dated October 11, 1932. Disclaimer filed October 15, 1935, by the patentee.

Hereby enters this disclaimer to that part of the claim in said specification, which is claim 1 of said patent, and in the following words to wit:

"1. Apparatus for conditioning the air in a passenger vehicle comprising means for circulating refrigerant, a cooling compartment in the vehicle located above the level of the space occupied by the passengers, a surface cooler in the compartment receiving refrigerant from said means, said compartment having a recirculated air inlet in its bottom in direct open communication with the upper portion of the passenger space and having an air oultet, the said inlet and outlet being arranged for the horizontal flow of air in the compartment from said inlet and over the surface cooler to the outlet and means located in said compartment between the cooler and the outlet for drawing air through the inlet and over the surface cooler and then forcing the air through the outlet over the space occupied by the passengers in said vehicle."

[*Official Gazette November 5, 1935.*]

DISCLAIMER 1,882,537.—*William B. Whitsitt*, Baltimore, Md. AIR CONDITIONING APPARATUS FOR PASSENGER CARS. Patent dated October 11, 1932. Disclaimer filed October 15, 1935, by the patentee.

Hereby enters this disclaimer to that part of the claim in said specification, which is claim 1 of said patent, and in the following words to wit:

"1. Apparatus for conditioning the air in a passenger vehicle comprising means for circulating refrigerant, a cooling compartment in the vehicle located above the level of the space occupied by the passengers, a surface cooler in the compartment receiving refrigerant from said means, said compartment having a recirculated air inlet in its bottom in direct open communication with the upper portion of the passenger space and having an air oultet, the said inlet and outlet being arranged for the horizontal flow of air in the compartment from said inlet and over the surface cooler to the outlet and means located in said compartment between the cooler and the outlet for drawing air through the inlet and over the surface cooler and then forcing the air through the outlet over the space occupied by the passengers in said vehicle."

[*Official Gazette November 5, 1935.*]